United States Patent
Barnes et al.

(10) Patent No.: US 9,284,481 B2
(45) Date of Patent: Mar. 15, 2016

(54) METHOD AND COMPOSITION FOR ENHANCED OIL RECOVERY

(75) Inventors: Julian Richard Barnes, Amsterdam (NL); Hendrik Dirkzwager, Amsterdam (NL); Quoc An On, Amsterdam (NL); Johan Paul Smit, Amsterdam (NL); Jasper Roelf Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 98 days.

(21) Appl. No.: 13/578,312

(22) PCT Filed: Feb. 9, 2011

(86) PCT No.: PCT/EP2011/051909
§ 371 (c)(1),
(2), (4) Date: Sep. 20, 2012

(87) PCT Pub. No.: WO2011/098493
PCT Pub. Date: Aug. 18, 2011

(65) Prior Publication Data
US 2013/0190543 A1    Jul. 25, 2013

Related U.S. Application Data

(60) Provisional application No. 61/303,981, filed on Feb. 12, 2010.

(51) Int. Cl.
*C09K 8/58* (2006.01)
*C09K 8/584* (2006.01)

(52) U.S. Cl.
CPC ....................................... *C09K 8/584* (2013.01)

(58) Field of Classification Search
CPC .................................................. C09K 8/58584

USPC .................. 510/492, 495, 498; 507/227, 259; 562/123–124
See application file for complete search history.

(56) References Cited

U.S. PATENT DOCUMENTS

| | | | |
|---|---|---|---|
| 4,183,867 A | 1/1980 | Sekiguchi et al. | ............ 260/513 |
| 4,248,793 A | 2/1981 | Sekiguchi et al. | ............ 260/513 |

(Continued)

FOREIGN PATENT DOCUMENTS

| | | | | |
|---|---|---|---|---|
| CN | 101589128 | 11/2009 | | |
| EP | 0351928 | * | 1/1990 | ............ C07C 303/06 |

(Continued)

OTHER PUBLICATIONS

Vu, Y. (2013). Investigation of interfacial tension of surfactant in low salinity water for enhanced oil recovery application, Masters thesis, Norwegian University of Science and Technology, Faculty of Natural Sciences and Technology, Department of Chemical Engineering, 69 pgs (Office action cites abstract only).*

(Continued)

*Primary Examiner* — Brian McCaig

(57) ABSTRACT

A method is provided for treating a hydrocarbon containing formation. The method comprises providing a hydrocarbon recovery composition comprising a mixture of branched internal olefin sulfonate molecules, and contacting hydrocarbons in the hydrocarbon containing formation with the hydrocarbon recovery composition. The mixture of branched internal olefin sulfonate molecules has an average number of carbon atoms of between 19 and 23, and an average number of branches of at least 0.6 per molecule. A hydrocarbon composition produced from a hydrocarbon containing formation, and a hydrocarbon recovery composition comprising a mixture of branched internal olefin sulfonate molecules are also provided.

29 Claims, 4 Drawing Sheets

(56) References Cited

U.S. PATENT DOCUMENTS

| | | | | |
|---|---|---|---|---|
| 4,488,976 | A | 12/1984 | Dilgren et al. | 252/8.55 |
| 4,544,033 | A | 10/1985 | Ukigai et al. | 166/274 |
| 4,597,879 | A | 7/1986 | Morita et al. | 252/8.55 |
| 4,852,653 | A | 8/1989 | Borchardt | 166/272 |
| 4,979,564 | A | 12/1990 | Kalpakci et al. | 166/273 |
| 5,068,043 | A | 11/1991 | Thigpen et al. | 252/855.4 |
| 5,103,909 | A | 4/1992 | Morgenthaler et al. | 166/288 |
| 5,199,490 | A | 4/1993 | Surles et al. | 166/270 |
| 5,284,206 | A | 2/1994 | Surles et al. | 166/270 |
| 5,510,306 | A | 4/1996 | Murray | 502/64 |
| 5,633,422 | A | 5/1997 | Murray | 585/671 |
| 5,648,584 | A | 7/1997 | Murray | 585/666 |
| 5,654,261 | A | 8/1997 | Smith | 507/269 |
| 5,849,960 | A | 12/1998 | Singleton et al. | 568/909 |
| 6,439,308 | B1 | 8/2002 | Wang | 166/270 |
| 2008/0171672 | A1 | 7/2008 | Cano et al. | 507/227 |
| 2009/0203557 | A1 | 8/2009 | Barnes et al. | |
| 2009/0203558 | A1 | 8/2009 | Barnes et al. | 507/277 |
| 2010/0282467 | A1 | 11/2010 | Hutchison et al. | |

FOREIGN PATENT DOCUMENTS

| | | | |
|---|---|---|---|
| WO | WO9640587 | 12/1996 | C01B 39/44 |
| WO | WO2009100228 | 8/2009 | C09K 8/584 |
| WO | 2011098493 | 8/2011 | |

OTHER PUBLICATIONS

Falls, et al.; "Field Test of Cosurfatant-enhanced Alkaline Flooding" Society of Petroleum Engineers Reservoir Engineering; pp. 217-223; Aug. 1994.

Craig, F. Jr; "The Reservoir Engineering Aspects of Waterflooding"; Society of Petroleum Engineers; Monograph, vol. 3; pp. 12-28 1971.

Stacke, H.W.; "Anionic Surfactants: Organic Chemistry"; Surfactant Science Series, vol. 56, Chapter 7; pp. 363-459; 1996.

Roberts, D.W., Dr et al.; "Why Internal Olefins are Difficult to Sulfonate"; Tenside Detergents 22, 4,; pp. 193-195; 1985.

\* cited by examiner

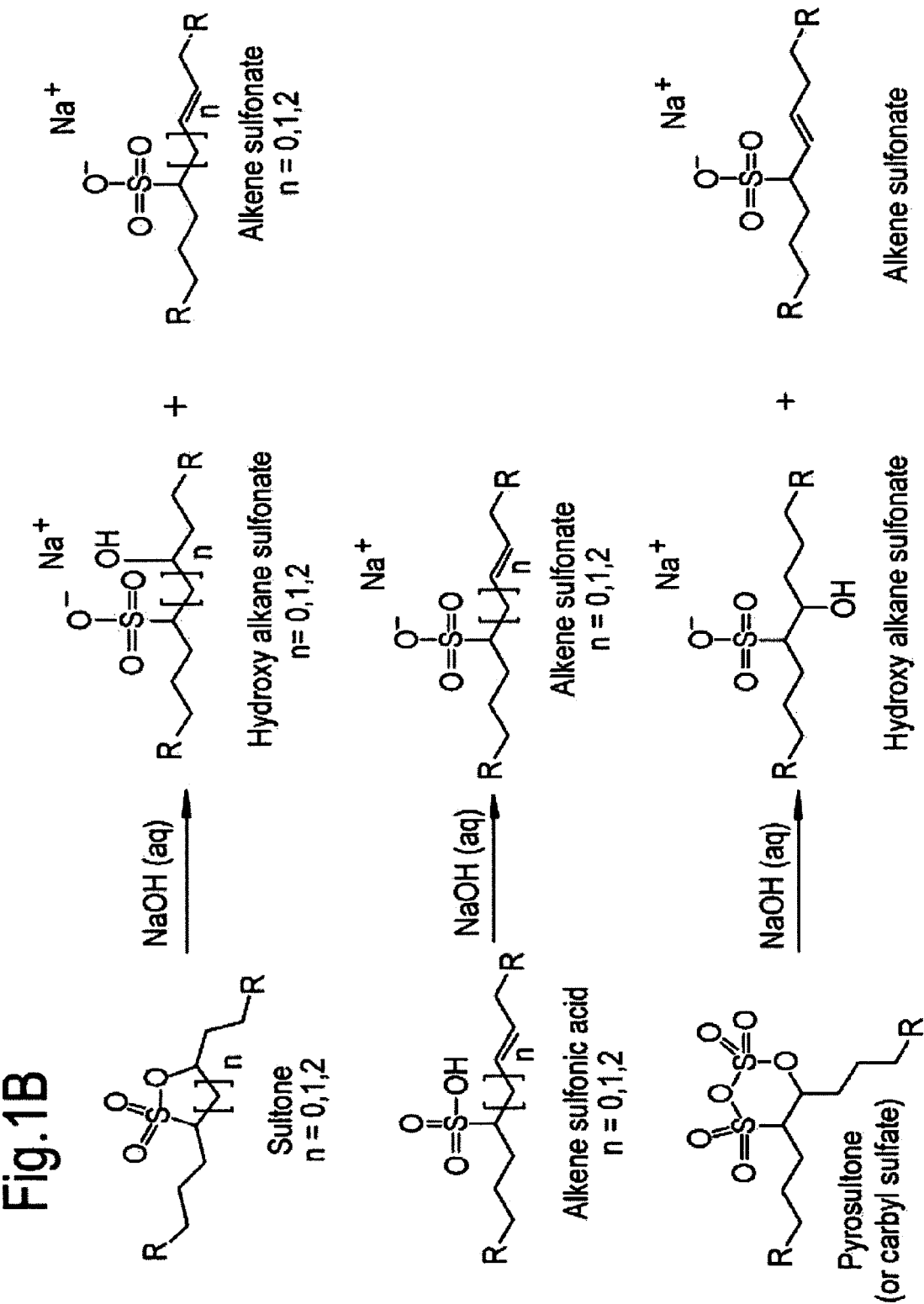

METHOD AND COMPOSITION FOR ENHANCED OIL RECOVERY

PRIORITY CLAIM

The present application claims priority from PCT/EP2011/051909, filed 9 Feb. 2011, which claims priority from U.S. provisional 61/303,981, filed 12 Feb. 2010.

FIELD OF THE INVENTION

The present invention generally relates to methods for recovery of hydrocarbons from hydrocarbon formations. More particularly, the invention relates to methods for enhanced hydrocarbons recovery and to compositions useful in such methods.

BACKGROUND OF THE INVENTION

Hydrocarbons, such as oil, may be recovered from hydrocarbon containing formations (or reservoirs) by penetrating the formation with one or more wells, which may allow the hydrocarbons to flow to the surface. A hydrocarbon containing formation may have a natural energy source (e.g. gas, water) to aid in mobilising hydrocarbons to the surface of the wells. For example, water or gas may be present in the formation at sufficient levels to exert pressure on the hydrocarbons to mobilise them to the surface of the production wells. However, reservoir conditions (e.g. permeability, hydrocarbon concentration, porosity, temperature, pressure) can significantly impact on the economic viability of hydrocarbon production from any particular hydrocarbon containing formation. Furthermore, any natural energy sources that exist may become depleted over time, often long before the majority of hydrocarbons have been extracted from the reservoir. Therefore, supplemental recovery processes may be required and used to continue the recovery of hydrocarbons from the hydrocarbon containing formation. Examples of known supplemental processes include waterflooding, polymer flooding, alkali flooding, thermal processes, solution flooding or combinations thereof.

In recent years there has been increased activity in developing new and improved methods of chemical Enhanced Oil Recovery (EOR) for maximising the yield of hydrocarbons from a subterranean reservoir. In surfactant EOR the mobilisation of residual oil saturation is achieved through surfactants which generate a sufficiently (ultra) low crude oil/water interfacial tension (IFT) to give a capillary number large enough to overcome capillary forces and allow the oil to flow (Chatzis & Morrows, 1989, "*Correlation of capillary number relationship for sandstone*", SPE Journal, 29, pp 555-562). However, different reservoirs can have very different characteristics (e.g. crude oil type, temperature, water composition—salinity, hardness etc.), and therefore, it is desirable that the structures and properties of the added surfactant(s) be matched to the particular conditions of a reservoir to achieve the required low IFT. In addition, a promising surfactant must fulfil other important criteria such as low rock retention, compatibility with polymer, thermal and hydrolytic stability and acceptable cost (including ease of commercial scale manufacture).

Compositions and methods for EOR utilising an alpha olefin sulfate-containing surfactant component are known (e.g. U.S. Pat. No. 4,488,976 and U.S. Pat. No. 4,537,253). Similarly, compositions and methods for EOR utilising internal olefin sulfonates (IOSs) are also known (see e.g. U.S. Pat. No. 4,597,879). The compositions described in the foregoing patents have the disadvantages that both brine solubility and divalent ion tolerance are insufficient under certain reservoir conditions. Hence, it would be advantageous if the reduction in IFT which can be achieved in relatively high salinity and/or hardness conditions could be improved. U.S. Pat. No. 4,979,564 describes the use of IOSs in a method for EOR using low tension viscous water flood. An example of a commercially available material described as being useful was ENORDET® IOS 1720, a product of Shell Oil Company identified as a sulfonated C17-20 internal olefin sodium salt. This material has a low degree of branching. U.S. Pat. No. 5,068,043 describes a petroleum acid soap-containing surfactant system for waterflooding wherein a cosurfactant comprising a C17-20 or a C20-24 IOS was used. In "*Field Test of Cosurfactant-enhanced Alkaline Flooding*" by Falls et al., Society of Petroleum Engineers Reservoir Engineering, 1994, the authors describe the use of a C17-20 or a C20-24 IOS in a waterflooding composition with an alcohol alkoxylate surfactant to keep the composition as a single phase at ambient temperature without affecting performance at reservoir temperature significantly. The water had a salinity of about 0.4 wt % sodium chloride. However, these materials, used individually, also have disadvantages under relatively severe conditions of salinity and hardness.

In WO 2009/100228 there is described a method for EOR in different high salinity reservoir conditions. When the salinity is from 2 wt % to 4 wt %, the hydrocarbon recovery composition comprises a blend of a C20-24 IOS and a C24-28 IOS, wherein the weight ratio of the C20-24 IOS to the C24-28 IOS is from 90:10 to 70:30; and when the salinity is from 4 wt % to 13 wt % the hydrocarbon recovery composition comprises a blend of a C20-24 IOS and a C15-18 IOS, wherein the weight ratio of the C20-24 IOS to the C15-18 IOS is from 90:10 to 70:30.

Although some surfactant compositions may have application as oil recovery compositions over broad salinity ranges, it is known that, for many surfactant compositions, as salinity increases the oil (or water) solubilisation parameter of the surfactant composition may proportionally decrease. Therefore, at higher salinities, the amount of hydrocarbon mobilised by the available recovery compositions may significantly reduce. Therefore, it would be desirable to have a hydrocarbon recovery composition for EOR that has applicability over a range of salinities and/or has a relatively high oil solubilisation parameter that is not significantly reduced over a significant proportion of its applicable salinity range.

Accordingly, the present invention seeks to overcome or at least alleviate one or more of the problems in the prior art.

SUMMARY OF THE INVENTION

In general, the present invention provides a hydrocarbon recovery composition for improving the recovery of hydrocarbons, such as oil, from hydrocarbon containing formations (e.g. subterranean reservoirs). The invention also provides a method for enhanced oil recovery (EOR) and hydrocarbon compositions recovered thereby. More specifically, the hydrocarbon recovery composition comprises a beneficial mixture of branched internal olefin sulfonate molecules that has particularly beneficial properties for use in EOR. The hydrocarbon recovery compositions of the invention demonstrate benefits in reducing interfacial tension (IFT) between hydrocarbon fluids and aqueous solutions (e.g. water or brine); they have high activity (i.e. a high oil solubilisation parameter); and they demonstrate high activity over a useful salinity range.

Thus, in accordance with a first aspect of the invention there is provided a method of treating a hydrocarbon containing formation. The method comprises providing a hydrocarbon recovery composition comprising a mixture (or population) of branched internal olefin sulfonate molecules, and contacting hydrocarbons in the hydrocarbon containing formation with the hydrocarbon recovery composition. The mixture of branched internal olefin sulfonate molecules has an average number of carbon atoms of between 19 and 23, and an average number of branches (i.e. a branching index, BI) of at least 0.6 per molecule.

In this way, hydrocarbons may be produced from a hydrocarbon containing formation having relatively high salinity, such as at offshore hydrocarbon reservoirs (e.g. in the North Sea), by treating at least a portion of the hydrocarbon containing formation with a hydrocarbon recovery composition of the invention.

Suitably, the mixture of branched internal olefin sulfonate molecules has an average number of carbon atoms of between 20 and 23, or between 20 and 22. More suitably, the mixture of branched internal olefin sulfonate molecules has an average number of carbon atoms of between 21 and 22. In one most suitable embodiment the average carbon number of the mixture of branched internal olefin sulfonate molecules is 21.5.

Beneficially, the majority of the branched internal olefin sulfonate molecules in the mixture of the invention have between 19 and 23 carbon atoms. In other words, at least 50 wt % of the mixture is within the range of 19 to 23 carbon atoms. More suitably at least 60 wt %, or at least 65 wt % of the population of molecules has between 19 and 23 carbon atoms. In some embodiments at least 70 wt %, at least 75 wt % or at least 80 wt % of the population of molecules has between 19 and 23 carbon atoms. Similarly, at least 65 wt % of the mixture of branched internal olefin sulfonate molecules has between 18 and 24 carbon atoms. Suitably at least 75 wt %, such as approximately 78 wt % of the mixture has between 18 and 24 carbon atoms. In some embodiments, at least 80 wt %, at least 85 wt % or at least 90 wt % of the population may have between 18 and 24 carbon atoms.

The molecules in the population of branched internal olefin sulfonates may have a distribution between 14 and 38 carbon atoms. For example, at least 95 wt %, suitably at least 98 wt % and more suitably at least 99 wt % (e.g. approximately 100 wt %) of the population has between 14 and 38 carbon atoms. Beneficially, at least 99 wt % of the branched internal olefin sulfonate molecules in the population are in the range of from 15 to 35 carbon atoms. More beneficially, at least 98 wt % of the branched internal olefin sulfonate molecules in the population are in the range of from 15 to 30 carbon atoms. Advantageously, at least 97 wt % of the branched internal olefin sulfonate molecules in the population are in the range of from 15 to 28 carbon atoms.

The average molecular weight of the mixture of branched internal olefin sulfonate molecules may range from 265 to 325, such as from 280 to 310, and suitably from 290 to 300. In one embodiment the average molecular weight is approximately 295.

The internal olefin sulfonate molecules in the mixture are generally branched. For example, at least 70%, suitably at least 80% and more suitably at least 90% of the olefin molecules contain at least one branch. Thus, the average number of branches per olefin molecule may be in the range of from 0.6 to 3.0. Suitably, the average number of branches per olefin molecule is from 0.6 to 1.2. In some embodiments, the average number of branches per olefin molecule is from 0.8 to 1.0. In a most suitable embodiment, the branching index (BI) is 0.9.

The sulfonation of branched internal olefins may be carried out in a thin film reactor at varying $SO_3$/olefin ratios. The sulfonation level may be "low" (e.g. less than or equal to 1.1 mol $SO_3$/mol olefin), or "high" (e.g. greater than or equal to 1.1 mol $SO_3$/mol olefin. Accordingly, the average number of sulfonate groups per olefin molecule will in most cases be determined by the applied $SO_3$-olefin molar ratio in the sulfonation process; in general, the higher the $SO_3$-olefin molar ratio is during the sulfonation process the higher is the number of $SO_3$ groups attached to the olefin.

Suitably, the mixture of internal olefin sulfonates comprises a mixture of lengths, branches and sulfonation states. In this way, the mixture is less likely to form undesirable ordered structures, such as gels or solids, and may have a broader range of hydrocarbon solubilisation properties. For example, the mixture of branched internal olefin molecules may comprise: at least 50% hydroxyalkane sulfonate molecules; up to 40% alkene sulfonate molecules; and up to 10% di-sulfonate molecules. Suitably, the mixture may comprise: from 50% to 90% hydroxyalkane sulfonate molecules; from 10% to 40% alkene sulfonate molecules; and from 0% to 10% di-sulfonate molecules. Beneficially, the mixture of branched internal olefin molecules comprises: from 50% to 70% hydroxyalkane sulfonate molecules; from 30% to 40% alkene sulfonate molecules; and from 1% to 9% di-sulfonate molecules. In a particularly suitable embodiment the mixture of branched internal olefin molecules comprises: from approximately 56% to approximately 64% hydroxyalkane sulfonate molecules; from approximately 32% to approximately 37% alkene sulfonate molecules; and from approximately 4% to approximately 7% di-sulfonate molecules; in each case provided the overall composition adds up to 100%. The composition of the mixture of internal olefin sulfonates may be measured, for example, using a liquid chromatography/mass spectrometry (LC-MS) technique.

The hydrocarbon recovery composition of the invention may be heated to, or used in a method for recovering hydrocarbons from a hydrocarbon reservoir at, a temperature range of 0° C. to 160° C., such as from 20° C. to 150° C., or from 30° C. to 140° C.

The hydrocarbon recovery composition of the invention suitably has a solubilisation parameter of at least 10, more suitably at least 20, such as at least 25, and in some embodiments at least 30 or at least 40.

In methods and compositions of the invention, the hydrocarbon recovery composition may further comprise water and/or brine. The water and/or brine can be made from various sources, but suitably is obtained from the hydrocarbon containing formation concerned, which may then be admixed with the hydrocarbon recovery composition. In accordance with preferred embodiments of the invention, the salinity of the hydrocarbon recovery composition is in the range from 2.5 wt % to 10 wt % or from 2.5 wt % to 8 wt %. The salinity is conveniently measured on the basis of NaCl equivalents. In some embodiments the hydrocarbon recovery composition has a salinity of from 3.0 wt % to 7 wt %; or more suitably, a salinity of from 3.5 wt % to 6.6 wt %. In one suitable embodiment, the hydrocarbon recovery composition has a salinity of from 2.5 wt % to 4.5 wt % when the applied $SO_3$/olefin ratio in the sulfonation process is less than 1.1. In an alternative embodiment, the hydrocarbon recovery composition has a salinity of from 4.5 wt % to 8 wt % when the applied $SO_3$/olefin ratio in the sulfonation process is higher than 1.1

In one embodiment, the mixture of branched internal olefin sulfonate molecules comprises from 0.01 wt % to 3.0 wt % of the hydrocarbon recovery composition further comprises water and/or brine and wherein of the composition. Beneficially, the mixture of branched internal olefin sulfonate molecules comprises from 0.025 wt % to 2.0 wt % of the composition, or from 0.05 wt % to 1.0 wt % of the composition. In some embodiments, the composition comprises from 0.1 wt % to 0.75 wt % of the total composition. The bulk of the hydrocarbon recovery composition is thus comprised of the water and/or brine.

The invention also encompasses a high active matter (HAM) composition comprising the mixture of internal olefin sulfonate molecules of the invention. Such a composition may comprise from 10 wt % to 90 wt % of the surfactant, from 20 wt % to 80 wt % or from 30 wt % to 70 wt %. Such a composition is particularly useful for storage and transportation of relatively reduced volumes that are suitable for dilution (e.g. with brine) at the place and time of intended use.

Suitably, the hydrocarbon recovery composition is an injectable solution. Therefore, the method may comprise injecting the hydrocarbon recovery composition into the hydrocarbon containing formation.

The hydrocarbon recovery composition may comprise any further ingredients or additives to make it suitable for use in recovering hydrocarbons from any particular hydrocarbon reservoir. Thus, hydrocarbon recovery composition may further comprise a solubilising agent. A solubilising agent may conveniently be added to the composition/brine mixture to keep it as a single phase before it is injected into the formation. For example, the solubilising agent may be an ethoxylated alcohol, e.g. based on an alcohol before ethoxylation having an average molecular weight of at least 220. When used, any suitable amount of solubilising agent may be used, such as up to 1 wt % or more of the total hydrocarbon recovery composition, up to 0.5 wt % or up to 0.1 wt %.

In some embodiments, the hydrocarbon recovery composition may advantageously further comprise a co-solvent to enhance hydrocarbon solubilisation (rather than to improve surfactant solubility), or to reduce micro-emulsion viscosity. A co-solvent may be an alcohol such as 2-butanol.

In some embodiments, the hydrocarbon recovery composition may advantageously further comprise an alkali. When used, the role of the alkali is to reduce surfactant adsorption, which can save chemical costs. In acidic crude oils, the alkali may also convert the petroleum acids into soaps, thereby further helping to lower the IFT. However, when the total acid number (TAN) of the hydrocarbon is low, saponification plays only a minor role.

In some embodiments, a polymer may be added to the hydrocarbon recovery composition to increase its viscosity. This stabilises the liquid front of the hydrocarbon recovery composition in use, and can provide an improved volumetric sweep of the hydrocarbon reservoir.

In some embodiments the hydrocarbon recovery compositions further comprise alkali, polymer co-solvent and/or solubilising agent. Selection of suitable additives for use in a particular (selected) hydrocarbon reservoir may be based on extensive testing, including phase behaviour tests, polymer rheology and filtration tests and core flow tests.

In another aspect of the invention, there is provided a hydrocarbon composition produced from a hydrocarbon containing formation. The hydrocarbon composition comprises hydrocarbons, and a mixture of branched internal olefin sulfonate molecules having an average number of carbon atoms of between 19 and 23, and an average number of branches of at least 0.6 per molecule. The hydrocarbon containing the hydrocarbon recovery composition may include any combination of hydrocarbons, internal olefin sulfonates, methane, water, asphaltenes, carbon monoxide and ammonia. The hydrocarbon composition may comprise a hydrocarbon recovery composition as described in relation to the first aspect of the invention and elsewhere herein.

In yet another aspect there is provided a hydrocarbon recovery composition comprising a mixture of branched internal olefin sulfonate molecules having an average number of carbon atoms of between 19 and 23, and an average number of branches of at least 0.6 per molecule. The hydrocarbon recovery composition may comprise any one or more of the features/properties described in relation to the first aspect of the invention and elsewhere herein.

These and other uses, features and advantages of the invention should be apparent to those skilled in the art from the teachings provided herein.

BRIEF DESCRIPTION OF THE DRAWINGS

The invention is further illustrated by the accompanying drawings in which.

DETAILED DESCRIPTION OF THE INVENTION

Figure 1A:
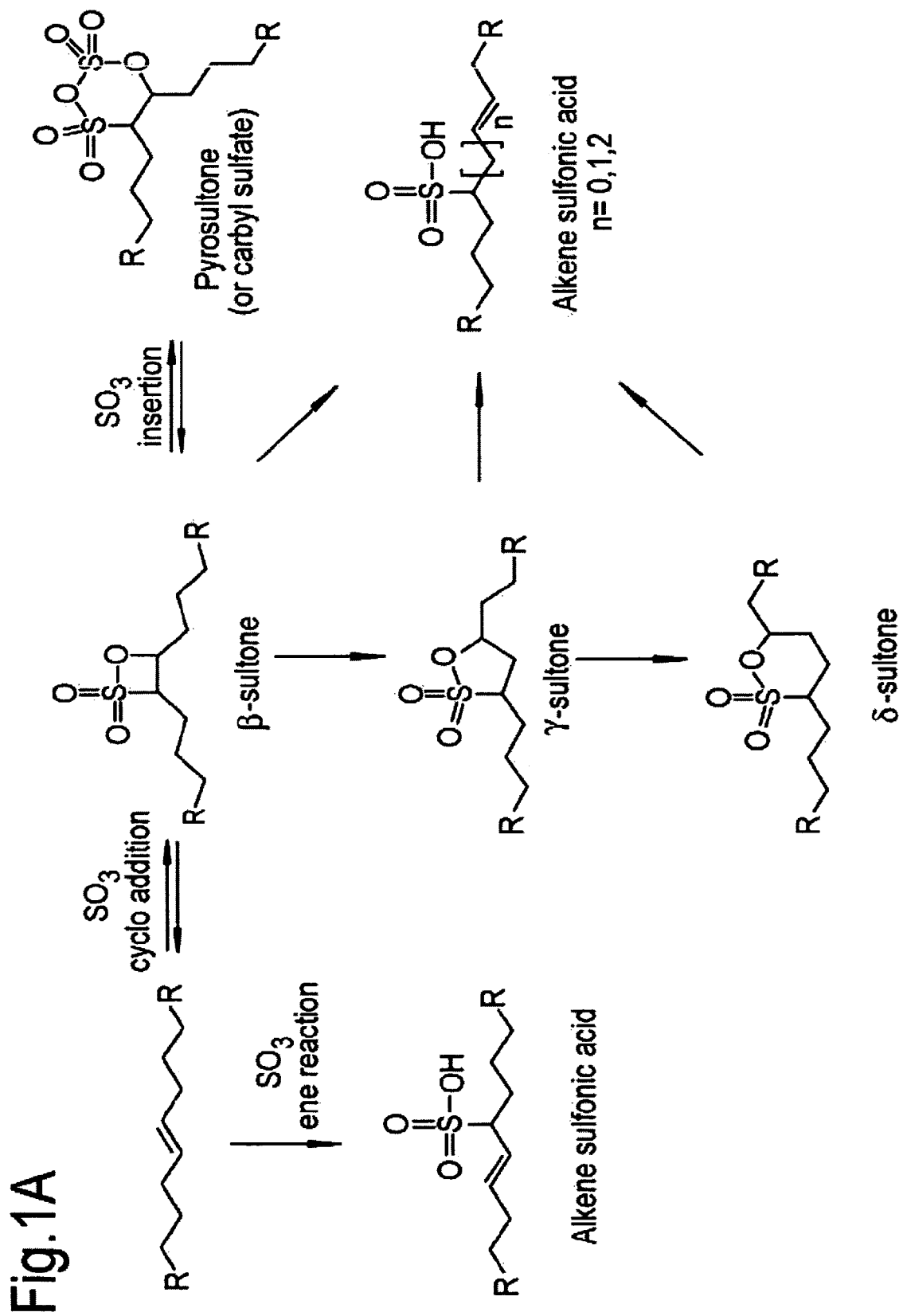
FIG. 1 is a schematic diagram depicting the chemical reactions in the manufacture of branched internal olefin sulfonates: (A) illustrates the reactions of an internal olefin with sulfur trioxide during the sulfonation process; (B) illustrates the subsequent neutralisation and hydrolysis process to form an internal olefin sulfonate.

All references cited herein are incorporated by reference in their entirety. Unless otherwise defined, all technical and scientific terms used herein have the same meaning as commonly understood by one of ordinary skill in the art to which this invention belongs.

In order to assist with the understanding of the invention several terms are defined herein.

An internal olefin is an olefin molecule in which a C=C double bond is located anywhere along the carbon chain except at a terminal carbon atom. A linear internal olefin does not have any alkyl, aryl, or alicyclic branching on any of the double bond carbon atoms or on any carbon atoms adjacent to the double bond carbon atoms. Typical commercial products produced by isomerisation of alpha olefins are predominantly linear and contain a low average number of branches per molecule. By a mixture of "branched internal olefins" it is meant that a majority (i.e. over 50%) of the internal olefin molecules in the mixture have at least one branch. Suitably, the internal olefin sulfonate molecules in the mixture of the invention are highly branched. For example, at least 70%, suitably at least 80% and more suitably at least 90% of the molecules contain at least one branch. The average number of branches per olefin molecule is suitably at least 0.6 per molecule (i.e. on average 60% of the molecules have at least one branch). A typical branch is a methyl group, although other branches may also be present.

The average number of carbon atoms (or average carbon number) of a mixture of molecules (specifically in relation to internal olefin sulfonate molecules) may be determined, for example, by multiplying the number of carbon atoms of each internal olefin sulfonate in the blend by the mole percent of that internal olefin sulfonate and then adding the products.

Suitably the mixture of branched internal olefin sulfonate molecules used in accordance with the invention has an average number of carbon atoms per molecule of from 19 to 23. For convenience, such a population of internal olefin sulfonate molecules is termed herein as "C19-23" or "19-23" IOS. More suitably, the mixture of internal olefin sulfonate molecules has an average number of carbon atoms per molecule of from 20 to 23, 20 to 22, or from 21 to 22.

Alternative internal olefin sulfonate fractions are termed herein as "C15-18", "C20-24" and "C24-28", to represent the average number of carbon atoms in each fraction. As before, in these fractions the majority of molecules have a number of carbon atoms within the ranges of the numbers indicated. "C15-18 internal olefin sulfonate" as used herein means a mixture of internal olefin sulfonates wherein the mixture has an average carbon number of from about 16 to about 17 and at least 50% by weight, preferably at least 75% by weight, most preferably at least 90% by weight, of the internal olefin sulfonates in the mixture contain from 15 to 18 carbon atoms. "C20-24 internal olefin sulfonate" as used herein means a mixture of internal olefin sulfonates wherein the mixture has an average carbon number of from about 20.5 to about 23 and at least 50% by weight, preferably at least 65% by 30 weight, most preferably at least 75% by weight, of the internal olefin sulfonates in the mixture contain from 20 to 24 carbon atoms. "C24-28 internal olefin sulfonate" as used herein means a blend of internal olefin sulfonates wherein the blend has an average carbon number of from 24.5 to 27 and at least 40% by weight, preferably at least 50% by weight, most preferably at least 60% by weight, of the internal olefin sulfonates in the blend contain from 24 to 28 carbon atoms.

"Optimal salinity" is defined by the salinity at which equal amounts of oil and water are solubilised in a middle phase (i.e. type III) microemulsion. The "oil solubilisation parameter" is the ratio of oil volume (Vo) to neat surfactant volume (Vs); and the "water solubilisation ratio" is the ratio of water volume (Vw) to neat surfactant volume (Vs). The intersection of Vo/Vs and Vw/Vs as salinity is varied defines the optimal salinity and the solubilisation parameter at the optimal salinity.

Hydrocarbons may be produced from hydrocarbon formations through wells penetrating a hydrocarbon containing formation. "Hydrocarbons" are generally defined as molecules formed primarily of carbon and hydrogen atoms such as oil and natural gas. Hydrocarbons may also include other elements, such as, but not limited to, halogens, metallic elements, nitrogen, oxygen and/or sulfur. Hydrocarbons derived from a hydrocarbon formation may include, but are not limited to, kerogen, bitumen, pyrobitumen, asphaltenes, oils or combinations thereof. Hydrocarbons may be located within or adjacent to mineral matrices within the earth. Matrices may include, but are not limited to, sedimentary rock, sands, silicilytes, carbonates, diatomites and other porous media.

Brine (or water) may also be present in the hydrocarbon containing formation. The brine from the hydrocarbon containing formation may be extracted and reinjected into the formation for use in waterflooding and/or EOR. This brine may be high in salinity and/or hardness. As used herein "salinity" refers to an amount of dissolved salt like sodium, potassium, calcium and magnesium chloride solids in water. Typically salinity is measured and defined herein with reference to equivalents of sodium chloride (NaCl). "Water hardness," as used herein, refers to a concentration of divalent ions (e.g. calcium, magnesium) in the water or brine. As used herein, high salinity means that the brine has 2 wt % or more of NaCl. Thus the hydrocarbon recovery composition of the invention is suitable for use in brine of high salinity. The salinity of seawater is in the range of 3.5 wt %, and so the compositions of the invention are particularly suitable for use in brines such as seawater. High hardness means that the concentration of calcium plus magnesium in the brine is greater than 0.01 wt %.

A "formation" (as used in connection with a "hydrocarbon containing formation") includes one or more hydrocarbon containing layers, one or more non-hydrocarbon layers, an overburden and/or an underburden. An "overburden" and/or an "underburden" includes one or more different types of impermeable materials. For example, overburden/underburden may include rock, shale, mudstone, or wet/tight carbonate (i.e. an impermeable carbonate without hydrocarbons). For example, an underburden may contain shale or mudstone. In some cases, the overburden/underburden may be somewhat permeable. For example, an underburden may be composed of a permeable mineral such as sandstone or limestone. In some embodiments, at least a portion of a hydrocarbon containing formation may exist at less than or more than 1000 feet below the earth's surface.

Properties of a hydrocarbon containing formation may affect how hydrocarbons flow through an underburden/overburden to one or more production wells. Properties include, but are not limited to, porosity, permeability, pore size distribution, surface area, salinity or temperature of formation. Overburden/underburden properties in combination with hydrocarbon properties, such as, capillary pressure (static) characteristics and relative permeability (flow) characteristics may effect mobilisation of hydrocarbons through the hydrocarbon containing formation. Permeability of a hydrocarbon containing formation may vary depending on the formation composition. A relatively permeable formation may include heavy hydrocarbons entrained in, for example, sand or carbonate. "Relatively permeable," as used herein, refers to formations or portions thereof, that have an average permeability of 10 millidarcy or more. "Relatively low permeability" as used herein, refers to formations or portions thereof that have an average permeability of less than about 10 millidarcy. One darcy is equal to about 0.99 square micrometers. An impermeable portion of a formation generally has a permeability of less than about 0.1 millidarcy. In some cases, a portion or all of a hydrocarbon portion of a relatively permeable formation may include predominantly heavy hydrocarbons and/or tar with no supporting mineral grain framework and only floating (or no) mineral matter (e.g. asphalt lakes).

Fluids (e.g. gas, water, hydrocarbons or combinations thereof) of different densities may exist in a hydrocarbon containing formation. A mixture of fluids in the hydrocarbon containing formation may form layers between an underburden and an overburden according to fluid density. Gas may form a top layer, hydrocarbons may form a middle layer and water (i.e. aqueous liquids) may form a bottom layer in the hydrocarbon containing formation. The fluids may be present in the hydrocarbon containing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. However, a first boundary may form between a water layer and underburden. A second boundary may form between a water layer and a hydrocarbon layer. A third boundary (or more) may form between hydrocarbons of different densities in a hydrocarbon containing formation. Thus, multiple fluids with multiple boundaries may be present in a hydrocarbon containing formation. It should be understood that many combinations of boundaries between fluids and between fluids and the overburden/underburden may be present in a hydrocarbon containing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult. Quantification of the interactions (e.g. energy level) at the interface of the fluids and/or fluids and overburden/underburden may be useful to predict mobilisation of hydrocarbons through the hydrocarbon containing formation.

Quantification of energy required for interactions (e.g. mixing) between fluids within a formation at an interface may be difficult to measure. Quantification of energy levels at an interface between fluids may be determined by generally known techniques (e.g. spinning drop tensiometer). Interaction energy requirements at an interface may be referred to as interfacial tension. "Interfacial tension" (or IFT) as used herein, refers to a surface free energy that exists between two or more fluids that exhibit a boundary. A high IFT value (e.g. greater than about 10 dyne/cm) may indicate the inability of one fluid to mix with a second fluid to form a fluid emulsion. As used herein, an "emulsion" refers to a dispersion of one immiscible fluid into a second fluid. Generally another composition (e.g. a surfactant) is added to the two (or more) immiscible fluids in order to reduce the IFT between the fluids and to achieve stability in the emulsion. The inability of the fluids to mix may be due to high surface interaction energy between the two fluids. Low IFT values (e.g. less than about 1 dyne/cm) may indicate less surface interaction between the two immiscible fluids. Less surface interaction energy between two immiscible fluids may result in the mixing of the two fluids to form an emulsion. Fluids with low interfacial tension values may be mobilised to a well bore due to reduced capillary forces and may be subsequently produced from a hydrocarbon containing formation. Fluids in a hydrocarbon containing formation may wet (e.g. adhere to an overburden/underburden or spread onto an overburden/underburden in a hydrocarbon containing formation). As used herein, "wettability" refers to the preference of a fluid to spread on or adhere to a solid surface in a formation in the presence of other fluids. Methods to determine wettability of a hydrocarbon formation are described by Craig, Jr. in "*The Reservoir Engineering Aspects of Waterflooding*", 1971, Monograph Volume 3, Society of Petroleum Engineers, which is herein incorporated by reference. In an embodiment, hydrocarbons may adhere to sandstone in the presence of gas or water. An overburden/underburden that is substantially coated by hydrocarbons may be referred to as "oil wet." An overburden/underburden may be oil wet due to the presence of polar and/or heavy hydrocarbons (e.g. asphaltenes) in the hydrocarbon containing formation. Formation composition (e.g. silica, carbonate or clay) may determine the amount of adsorption of hydrocarbons on the surface of an overburden/underburden. In some embodiments, a porous and/or permeable formation may allow hydrocarbons to more easily wet the overburden/underburden. A substantially oil wet overburden/underburden may inhibit hydrocarbon production from the hydrocarbon containing formation. In certain embodiments, an oil wet portion of a hydrocarbon containing formation may be located at less than or more than 1000 feet below the earth's surface.

A hydrocarbon formation may include water. Water may interact with the surface of the underburden. As used herein, "water wet" refers to the formation of a coat of water on the surface of the overburden/underburden. A water wet overburden/underburden may enhance hydrocarbon production from the formation by preventing hydrocarbons from wetting the overburden/underburden. In certain embodiments, a water wet portion of a hydrocarbon containing formation may include minor amounts of polar and/or heavy hydrocarbons.

Water in a hydrocarbon containing formation may contain minerals (e.g. minerals containing barium, calcium, or magnesium) and mineral salts (e.g. sodium chloride, potassium chloride, magnesium chloride). Salinity and/or hardness of water in a formation may affect recovery of hydrocarbons in a hydrocarbon containing formation. Water salinity and hardness may be determined by generally known methods (e.g. conductivity, titration). As water salinity increases in a hydrocarbon containing formation, IFTs between hydrocarbons and water tend to be increased and the fluids may therefore become more difficult to produce.

A hydrocarbon containing formation may be selected for EOR treatment based on factors such as, but not limited to, thickness of hydrocarbon containing layers within the formation, assessed liquid production content, location of the formation, salinity content of the formation, temperature of the formation, and depth of hydrocarbon containing layers. Initially, natural formation pressure and temperature may be sufficient to cause hydrocarbons to flow into well bores and out to the surface. Temperatures in a hydrocarbon containing formation may range from about 0° C. to about 300° C. As hydrocarbons are produced from a hydrocarbon containing formation, pressures and/or temperatures within the formation may decline. Various forms of artificial lift (e.g. pumps, gas injection) and/or heating may be employed to continue to produce hydrocarbons from the hydrocarbon containing formation. Production of desired hydrocarbons from the hydrocarbon containing formation may become uneconomical as hydrocarbons are depleted from the formation and/or as the difficulty of extraction increases.

Mobilisation of residual hydrocarbons retained in a hydrocarbon containing formation may be difficult due to viscosity of the hydrocarbons and/or capillary effects of fluids in pores of the hydrocarbon containing formation. As used herein "capillary forces" refers to attractive forces between fluids and at least a portion of the hydrocarbon containing formation. In some cases, capillary forces may be overcome by increasing the pressures within a hydrocarbon containing formation. In other cases, capillary forces may be overcome by reducing the IFT between fluids in a hydrocarbon containing formation. The ability to reduce the capillary forces in a hydrocarbon containing formation may depend on a number of factors, including, but not limited to, the temperature of the hydrocarbon containing formation, the salinity of water in the hydrocarbon containing formation, and the composition of the hydrocarbons in the hydrocarbon containing formation.

As production rates decrease, additional methods may be employed to make a hydrocarbon containing formation more economically viable. Methods may include adding sources of water (e.g. brine, steam), gases, polymers, monomers or any combinations thereof to the hydrocarbon formation to increase mobilisation of hydrocarbons.

In one embodiment, a hydrocarbon containing formation may be treated with a flood of water. A waterflood may include injecting water into a portion of a hydrocarbon containing formation through one or more injections wells. Flooding of at least a portion of the formation may water wet a portion of the hydrocarbon containing formation. The water wet portion of the hydrocarbon containing formation may be pressurised by known methods and a water/hydrocarbon mixture may be collected using one or more production wells. The water layer, however, may not mix with the hydrocarbon layer efficiently. Poor mixing efficiency may be due to a high IFT between the water and hydrocarbons.

Production of the desired hydrocarbons from a hydrocarbon containing formation may in some circumstances be enhanced by treating the hydrocarbon containing formation with a polymer and/or monomer that may mobilise hydrocarbons to one or more production wells. The polymer and/or monomer may reduce the mobility of the water phase in pores of the hydrocarbon containing formation. The reduction of water mobility may allow the hydrocarbons to be more easily mobilised through the hydrocarbon containing formation. Polymers include, but are not limited to, polyacrylamides, partially hydrolysed polyacrylamide, polyacrylates, ethylenic copolymers, biopolymers, carboxymethylcellulose, polyvinyl alcohol, polystyrene sulfonates, polyvinylpyrrolidone, AMPS (2-acrylamide-2-methyl propane sulfonate) or combinations thereof. Examples of ethylenic copolymers include copolymers of acrylic acid and acrylamide, acrylic acid and lauryl acrylate, lauryl acrylate and acrylamide. Examples of biopolymers include xanthan gum and guar gum. In some embodiments, polymers may be crosslinked in situ in a hydrocarbon containing formation. In other embodiments, polymers may be generated in situ in a hydrocarbon containing formation. Polymers and polymer preparations for use in oil recovery are described, for example, in U.S. Pat. No. 6,427,268 (Zhang et al.); U.S. Pat. No. 6,439,308 (Wang); U.S. Pat. No. 5,654,261 (Smith); U.S. Pat. No. 5,284,206 (Surles et al.); U.S. Pat. No. 5,199,490 (Surles et al.); and U.S. Pat. No. 5,103,909 (Morgenthaler et al.); all of which are incorporated by reference herein.

The Hydrocarbon Recovery Composition

In accordance with the invention, a hydrocarbon recovery composition may be provided to the hydrocarbon containing formation. The composition comprises a mixture or blend of internal olefin sulfonates (IOSs). The mixture or internal olefin sulfonates of the invention is chemically suitable for EOR because it is a complex mixture of molecules with different chain lengths and, therefore, the molecules have a low tendency to form ordered structures/liquid crystals (which can lead to problems in EOR, such as plugging of the rock structure in hydrocarbon formations). In addition, the mixture of internal olefin sulfonates of the invention shows a low tendency to adsorb on reservoir rock surfaces due to negative-negative charge repulsion between the rock surface and the surfactant. Furthermore, the mixture of internal olefin sulfonates of the invention is relatively temperature stable (compared with many other types of surfactants), which means that it has a broad useful temperature range (e.g. up to approx. 160° C.), which is compatible with the reservoir conditions in many hydrocarbon formations. The use of added alkali may further reduce the tendency for the internal olefin sulfonate surfactants of the invention to adsorb to surfaces, and thus reduces surfactant losses in use, meaning that a lower concentration of the internal olefin sulfonate surfactant molecules can be used and the process is more economical.

As discussed above in detail, this invention is particularly useful in hydrocarbon containing formations that have the characteristics of moderate levels of salinity, such as those in the North Sea. The brine from such hydrocarbon containing formations generally has greater than 2 wt % of sodium chloride and a hardness of calcium plus magnesium in the brine of around 0.01 wt %. The hydrocarbon recovery composition of this invention are suitable for use in such hydrocarbon containing formations and are beneficially compatible with the brine/water found in these formations. The hydrocarbon recover composition of the invention may be used in salinity conditions above approximately 2 wt %, such as from about 2 wt % to about 12 wt %, or from about 2.5 wt % to about 10 wt %. In some embodiments the hydrocarbon recovery composition is suitable for use at a salinity of from about 3.0 wt % to about 7 wt %; or more suitably, a salinity of from about 3.5 wt % to about 6.6 wt %.

As indicated above, the mixture of internal olefin sulfonate molecules of the invention conveniently comprises a large range of different molecules, which may differ from one another in terms of carbon chain length, amount of branching and the number and distribution of functional (such as sulfonates and hydroxyl groups). In one embodiment, the mixture of branched internal olefin sulfonates comprises: at least 50% hydroxyalkane sulfonate molecules; up to 40% alkene sulfonate molecules; and up to 10% di-sulfonate molecules. A suitable mixture may comprise: from 50% to 90% hydroxyalkane sulfonate molecules; from 10% to 40% alkene sulfonate molecules; and from 0% to 10% di-sulfonate molecules. In another suitable embodiment the mixture of branched internal olefin molecules may comprise: from 56% to 64% hydroxyalkane sulfonate molecules; from 32% to 37% alkene sulfonate molecules; and from 4% to 7% di-sulfonate molecules.

The invention also provides a hydrocarbon containing composition that is produced from a hydrocarbon containing formation in accordance with the invention. The hydrocarbon containing composition may include any combination of hydrocarbons, the mixture or blend of branched internal olefin sulfonates described above, a solubilising agent, methane, water, asphaltenes, carbon monoxide and ammonia. The remainder of the composition may include, but is not limited to water, low molecular weight alcohols, organic solvents, alkyl sulfonates, aryl sulfonates, brine or combinations thereof. Low molecular weight alcohols include, but are not limited to, methanol, ethanol, propanol, isopropyl alcohol, tert-butyl alcohol, sec-butyl alcohol, butyl alcohol, tert-amyl alcohol or combinations thereof. Organic solvents include, but are not limited to, methyl ethyl ketone, acetone, lower alkyl cellosolves, lower alkyl carbitols or combinations thereof.

Manufacture of the Hydrocarbon Recovery Composition

The branched internal olefins that are used to make the internal olefin sulfonates of the present invention may be made by skeletal isomerisation. Suitable processes for making the internal olefins include those described, for example, in: U.S. Pat. Nos. 5,510,306, 5,633,422, 5,648,584, 5,648, 585, 5,849,960; European patent number EP 0,830,315; and "Anionic Surfactants: Organic Chemistry", Surfactant Science Series, Vol. 56, Chapter 7, Marcel Dekker, Inc., New York, 1996, ed. H. W. Stacke; all of which are herein incorporated by reference in their entirety.

A hydrocarbon stream comprising at least one linear olefin is contacted with a suitable catalyst, such as the catalytic zeolites described in the aforementioned patents, in a vapour phase at a suitable reaction temperature, pressure, and space velocity. Generally, suitable reaction conditions include a temperature of about 200° C. to about 650° C., an olefin partial pressure of above about 0.5 atmosphere, and a total pressure of about 0.5 to about 10.0 atmospheres or higher. Preferably, the internal olefins of the present invention are made at a temperature in the range of from about 200° C. to about 500° C. at an olefin partial pressure of from about 0.5 to 2 atmospheres.

The production of an internal olefin sulfonates from internal olefins consists of three separate reaction steps: sulfonation, neutralisation and hydrolysis (Adami, "Production of linear alkylbenzene sulphonate and alpha-olefin sulphonates", Surfactant Science Series, Vol. 142, chapter 5, page 83). The resulting mixture of products is complex containing a very large number of species.

In the sulfonation step, reaction of internal olefins with $SO_3$ leads to the formation of cyclic intermediates known as beta-sultones, which rapidly undergo isomerisation to unsaturated sulfonic acids and the more stable gamma- and delta-sultones. This reaction is preferably carried out in a "falling film reactor" where the olefin feed is continuously fed onto the inside surfaces of a tube and gaseous $SO_3$ is fed into the tube to react with the falling olefin film in a controlled manner. In the neutralisation step these sultones are partially hydrolysed with aqueous sodium hydroxide to a mixture of hydroxyalkane sulfonates and alkene sulfonates and further conversion is achieved in the subsequent hydrolysis step that is carried out at elevated temperature. FIG. 1A illustrates the reactions involved in the sulfonation process and FIG. 1B shows the steps of the neutralisation and hydrolysis process.

In contrast to reaction of $SO_3$ with alpha olefin, where the double bond is in the terminal carbon position, $SO_3$ reacts with an internal olefin at any position along the chain since the double bond is randomly positioned. This results in a variety of twin-tailed products. In addition, due to the many reactions involved during sulfonation, neutralisation and hydrolysis the end product is a complex mixture. On average an internal olefin sulfonate has a typical composition of 50-80% hydroxyalkane sulfonates, 15-50% alkene sulfonates and approx. 1-5% of disulfonate species. However, the actual composition of the end products is determined by the olefin feedstock type, in which the following structural features having an influence: carbon number distribution, linearity (including the amount and type of branched components) and molecular weight. The end product composition is also determined by process conditions, applied in particular in the sulfonation and neutralisation steps. Since the final composition of the product is important for end-product EOR performance and therefore accurate control of process parameters such as reaction temperature profile, $SO_3$ gas-phase concentration, and $SO_3$/olefin molar ratio are of particular importance.

It is generally known that internal olefins are more difficult to sulfonate than alpha olefins (see "Tenside Detergents" 22 (1985) 4, pp. 193-195). In the article entitled "Why Internal Olefins are Difficult to Sulfonate" the authors state that by the sulfonation of various commercial and laboratory produced internal olefins using falling film reactors, internal olefins gave conversions of below 90 percent and further they state that it was found necessary to raise the $SO_3$:internal olefin mole ratio to over 1.6:1 in order to achieve conversions above 95 percent. U.S. Pat. No. 4,183,867 and U.S. Pat. No. 4,248, 793, which are herein incorporated by reference, describe processes which can be used to make the branched internal olefin sulfonates of the invention. These processes use a falling film reactor for the preparation of light coloured internal olefin sulfonates. The amounts of unreacted internal olefins are between 10 and 20 percent and at least 20 percent, respectively, in the processes and special measures must be taken to remove the unreacted internal olefins. The internal olefin sulfonates containing between 10 and 20 percent and at least 20 percent, respectively, of unreacted internal olefins must be purified before being used. European patent EP 0,351,928, which is herein incorporated by reference, describes an alternative approach for preparing branched internal olefin sulfonates, which improves on some of the problems encountered in U.S. Pat. No. 4,183,867 and U.S. Pat. No. 4,248,793.

A process which can be used to make internal olefin sulfonates for use in the present invention comprises reacting in a film reactor an internal olefin as described above with a sulfonating agent in a mole ratio of sulfonating agent to internal olefin of 1:1 to 1.5:1 (e.g. between 1.05:1 to 1.3:1) while cooling the reactor with a cooling means having a temperature not exceeding 50° C., directly neutralising the obtained reaction product of the sulfonating step and, without extracting the unreacted internal olefin, hydrolysing the neutralised reaction product.

In the preparation of the sulfonates derived from internal olefins, the internal olefins are reacted with a sulfonating agent, which may be sulfur trioxide, sulfuric acid, or oleum, with the formation of beta-sultone and some alkane sulfonic acids. The film reactor is preferably a falling film reactor.

The reaction products are neutralised and optionally hydrolysed. Under certain circumstances, for instance, aging, the beta-sultones are converted into gamma-sultones which may be converted into delta-sultones. After neutralisation and hydrolysis, gamma-hydroxysulfonates and delta-hydroxysulfonates are obtained. A disadvantage of these two sultones is that they are more difficult to hydrolyse than beta-sultones. Thus, in most embodiments it is preferable to proceed without aging. The beta-sultones, after hydrolysis, give beta-hydroxysulfonates. These materials do not have to be removed because they form useful surfactant structures. The cooling means, which is preferably water, has a temperature not exceeding 50° C. Depending upon the circumstances, lower temperatures may also be used.

The reaction mixture is then fed to a neutralisation hydrolysis unit. The neutralisation/hydrolysis steps are carried out with a water-soluble base, such as sodium hydroxide or sodium carbonate. The corresponding bases derived from potassium or ammonium are also suitable. The neutralisation of the reaction product from the falling film reactor is generally carried out with excessive base, calculated on the acid component. Generally, neutralisation is carried out at a temperature in the range of from 0° C. to 80° C. Hydrolysis may be carried out at a temperature in the range of from 100° C. to 250° C., preferably 130° C. to 200° C. The hydrolysis time generally may be from 5 minutes to 4 hours. Alkaline hydrolysis may be carried out with hydroxides, carbonates, bicarbonates of (earth) alkali metals, and amine compounds. This process may be carried out batch wise, semi-continuously, or continuously. The reaction is generally performed in a falling film reactor, which is cooled by flowing a cooling means at the outside walls of the reactor. At the inner walls of the reactor, the internal olefin flows in a downward direction. Sulfur trioxide is diluted with a stream of nitrogen, air, or any other inert gas into the reactor. The concentration of sulfur trioxide generally is between 2 and 4 percent by volume based on the volume of the carrier gas. In the preparation of internal olefin sulfonates derived from the olefins of the present invention, it is required that in the neutralisation hydrolysis step very intimate mixing of the reactor product and the aqueous base is achieved. This can be done, for example, by efficient stirring or the addition of a polar co-solvent (such as a lower alcohol) or by the addition of a phase transfer agent.

Internal olefin sulfonate mixtures are manufactured by and available commercially from Shell Chemicals as the ENORDET™ O series.

Data on six internal olefin sulfonate mixtures produced in large scale are shown in Table 1. As indicated, two of the IOS samples were sulfonated at different $SO_3$/olefin ratios so that the effect of sulfonation level could be assessed. The table shows that values for Free Oil contents (the neutral species in the form of e.g. unconverted olefins and sultones) increase with molecular weight and branched content of the olefin feedstock. Beneficially, Free Oil values are as low as possible. The values shown in Table 1 (up to 12% relative to 100% active surfactant) may represent what is achievable with heavier internal olefin feedstocks. Table 1 also shows that significant amounts of inorganic sulfate are formed as a result of decomposition reactions of the initially formed sulfonated species such as pyrosultones (see FIG. 1). The relatively low amount of hydroxyalkane sulfonate and the corresponding higher alkene sulfonate concentration in the IOS 24-28 sample may be caused by a combination of the higher sulfonation temperatures applied (cooling water temperature was higher c.f. used for other internal olefin samples), and/or the higher branching level of the internal olefin feedstock. The average higher temperature will lead to more isomerisation of the initial formed beta sultones to alkene-sulfonic acids, this occurring in the bottom part of the reactor. At higher temperatures the ene-reaction becomes more important, leading to direct formation of alkene sulfonic acids from internal olefins and $SO_3$.

In all cases, the main surfactant species formed with each fraction comprise a range of twin-tailed isomers of alkene sulfonate and a range of twin-tailed isomers of hydroxyalkane sulfonates, each of these carbon numbers depending on the internal olefin feedstock. Low concentrations of di-sulfonated molecules are also formed. As already indicated, the fact that an IOS composition comprises a complex mixture of molecules has advantages in surfactant EOR through minimising the formation of ordered structures that might result in liquid crystals and gels for oil/water/surfactant mixtures.

Injection of the Hydrocarbon Recovery Composition

The hydrocarbon recovery composition may interact with hydrocarbons in at least a portion of the hydrocarbon containing formation. Interaction with the hydrocarbons may reduce an IFT of the hydrocarbons with one or more fluids in the hydrocarbon containing formation. For example, a hydrocarbon recovery composition may reduce the IFT between the hydrocarbons and an overburden/underburden of a hydrocarbon containing formation. Reduction of the IFT may allow at least a portion of the hydrocarbons to mobilise through the hydrocarbon containing formation. The ability of a hydrocarbon recovery composition to reduce the IFT of a mixture of hydrocarbons and fluids may be evaluated using known techniques. In accordance with the invention, an IFT value for a mixture of hydrocarbons and water may be determined using a spinning drop tensiometer. An amount of the hydrocarbon recovery composition may be added to the hydrocarbon/water mixture and an IFT value for the resulting fluid may be determined. A low IFT value (e.g. less than about 1 dyne/cm) may indicate that the composition reduced at least a portion of the surface energy between the hydrocarbons and water. Reduction of surface energy may indicate that at least a portion of the hydrocarbon/water mixture may mobilise through at least a portion of a hydrocarbon containing formation.

In one embodiment, a hydrocarbon recovery composition may be added to a hydrocarbon/water mixture and the IFT value may be determined. An ultra low IFT value (e.g. less than about 0.01 dyne/cm) may indicate that the hydrocarbon

TABLE 1

Properties of pilot scale IOS samples

|  | IOS 15-18 (Low SO3) | IOS 20-24 (Low SO3) | IOS 20-24 (High SO3) | IOS 19-23 (Low SO3) | IOS 19-23 (High SO3) | IOS 24-28 (Low SO3) |
|---|---|---|---|---|---|---|
| Feedstock: |  |  |  |  |  |  |
| Carbon Number Range (approximate) | 15-18 | 20-24 | 20-24 | 19-23 | 19-23 | 24-28 |
| Molecular Weight (average) | 232 | 287 | 287 | 295 | 295 | 378 |
| Realtive branched content | low | low | low | high | high | high |
| Sulfonation conditions: |  |  |  |  |  |  |
| Molar ratio SO3/olefin | low | low | high | low | high | low |
| Cooling water temp. (° C.) | low | low | low | low | low | high |
| Properties#: |  |  |  |  |  |  |
| Free Oil (% w) | 3.1 | 11.2 | 5.9 | 11.4 | 8.4 | 13.0 |
| Na2SO4 (% w) | 3.1 | 5.5 | 7.4 | 8.2 | 11.2 | 9.1 |
| % Active (% w) | 33.4 | 28.3 | 31.4 | 33.1 | 36.3 | 28.3 |
| Composition by LC-MS: |  |  |  |  |  |  |
| Hydroxyalkane sulphonate (% abundance) | 81 | 75 | 73 | 64 | 56 | 51 |
| Alkene sulphonate (% abundance) | 18 | 24 | 26 | 32 | 37 | 47 |
| Di-sulphonates (% abundance) | 0.5 | 0.3 | 0.7 | 4.0 | 7.0 | 1.8 |

Free Oil and Na2SO4 are reported relative to 100% active surfactant recovery composition lowered at least a portion of the surface tension between the hydrocarbons and water such that at least a portion of the hydrocarbons may mobilise through at least a portion of the hydrocarbon containing formation. At least a portion of the hydrocarbons may mobilise more easily through at least a portion of the hydrocarbon containing formation at an ultra low interfacial tension than hydrocarbons that have been treated with a composition that results in an IFT value greater than 0.01 dyne/cm for the fluids in the formation. Addition of a hydrocarbon recovery composition to fluids in a hydrocarbon containing formation that results in an ultra low IFT value may increase the efficiency at which hydrocarbons are produced. Beneficially, in use, the hydrocarbon recovery composition concentration in the hydrocarbon containing formation may be minimised to minimise the cost of use during production.

In an embodiment of the method of the invention, a hydrocarbon recovery composition including a mixture of branched internal olefin sulfonate molecules may be provided (e.g. injected) into a hydrocarbon containing formation through an injection well. The hydrocarbon formation may include an overburden, a hydrocarbon layer, and an underburden. The injection well may include openings that allow fluids to flow through the hydrocarbon containing formation at various depth levels within the reservoir. The hydrocarbon layer may be less than 1000 feet below the earth's surface. The underburden of the hydrocarbon containing formation may be oil wet, and/or low salinity water may also be present in the hydrocarbon containing formation.

A hydrocarbon recovery composition may be provided to the formation in an amount that is typically based on amount and type of hydrocarbons present in a hydrocarbon containing formation. The amount of hydrocarbon recovery composition, however, may be too small to be accurately delivered to the hydrocarbon containing formation using known delivery techniques (e.g. pumps). To facilitate delivery of small amounts of the hydrocarbon recovery composition to the hydrocarbon containing formation, the hydrocarbon recovery composition may be combined with water and/or brine to produce a larger volume of injectable fluid.

Conveniently, the hydrocarbon recovery composition may be provided to the target hydrocarbon containing formation by admixing it with brine from the formation from which the hydrocarbons are to be extracted. The mixture is then injected into the hydrocarbon containing formation. Generally, the hydrocarbon recovery composition comprises from about 0.01 wt % to about 3.0 wt % of the total water and/or brine/hydrocarbon recovery composition mixture (i.e. the total volume of the composition). An important consideration is the amount of actual active matter that is present in the injectable fluid (active matter being the surfactant molecules themselves: here the mixture of branched internal sulfonates having an average number of carbon atoms per molecule of 19 to 23). Thus, the amount of active surfactant in the injectable fluid may be in the range of, for example: 0.01 wt % to 2.0 wt %, 0.025 wt % to 2.0 wt %, 0.05 wt % to 1.0 wt %, or 0.1 wt % to 0.75 wt %.

The injectable fluid may then be injected into the hydrocarbon containing formation. A solubiliser may be added to the composition/brine mixture (the injectable fluid) to keep it as a single phase before it is injected into the formation. The solubiliser may be an ethoxylated alcohol. The solubiliser may comprise 1 wt % or more of the total hydrocarbon recovery composition/brine mixture, but suitably the solubiliser comprises less than 0.1 wt % of the mixture, preferably 0.02 wt % to 0.05 wt %.

Once within the formation or reservoir, the hydrocarbon recovery composition interacts with at least a portion of the hydrocarbons in hydrocarbon layer. The interaction of the hydrocarbon recovery composition with the hydrocarbon layer suitably reduces at least a portion of the IFT between different hydrocarbons. The hydrocarbon recovery composition may also reduce at least a portion of the IFT between one or more fluids (e.g. water, hydrocarbons) in the formation and the underburden, one or more fluids in the formation and the overburden, or combinations thereof.

Furthermore, a hydrocarbon recovery composition of the invention may interact with at least a portion of the hydrocarbons and at least a portion of one or more other fluids in the formation to reduce at least a portion of the IFT between the hydrocarbons and one or more fluids. Reduction of the IFT may allow at least a portion of the hydrocarbons to form an emulsion with at least a portion of one or more fluids in the formation. The IFT value between hydrocarbons and one or more fluids within the formation is advantageously altered by the hydrocarbon recovery composition to a value of less than about 0.1 dyne/cm. In a particularly advantageous embodiment, an IFT value between hydrocarbons and other fluids in a formation may be reduced by the hydrocarbon recovery composition to less than about 0.05 dyne/cm. In most beneficially embodiments, an IFT value between hydrocarbons and other fluids in a formation may be lowered by the hydrocarbon recovery composition to less than 0.001 dyne/cm.

At least a portion of the hydrocarbon recovery composition/hydrocarbon/fluids mixture may be mobilised to the production well. Products obtained from the production well may include, but are not limited to, components of the hydrocarbon recovery composition (e.g. a long chain aliphatic alcohol and/or a long chain aliphatic acid salt), methane, carbon monoxide, water, hydrocarbons, ammonia, asphaltenes, or combinations thereof. Beneficially, hydrocarbon production from the hydrocarbon containing formation is increased by any economically viable amount, which amount will depend on the reservoir concerned. For example, hydrocarbon production may be increased by 10% or more.

The hydrocarbon containing formation may be pre-treated with a hydrocarbon removal fluid. A hydrocarbon removal fluid may be composed of water, steam, brine, gas, liquid polymers, foam polymers, monomers or mixtures thereof. Typically, a hydrocarbon removal fluid may be used to treat a formation before a hydrocarbon recovery composition is provided to the formation. In some embodiments of the invention, the hydrocarbon removal fluid may be heated before injection into a hydrocarbon containing formation. A hydrocarbon removal fluid may be used to reduce the viscosity of at least a portion of the hydrocarbons within the formation. Reduction of the viscosity of at least a portion of the hydrocarbons in the formation may enhance mobilisation of at least a portion of the hydrocarbons.

After at least a portion of the hydrocarbons in the hydrocarbon containing formation have been mobilised, repeated injection of the same or different hydrocarbon removal fluids may become less effective in mobilising hydrocarbons through the hydrocarbon containing formation. By way of example, a low efficiency of mobilisation may be due to hydrocarbon removal fluids creating more permeable zones in the hydrocarbon containing formation. Hydrocarbon removal fluids may pass through the permeable zones in the hydrocarbon containing formation and not interact with and mobilise the remaining hydrocarbons. Consequently, displacement of heavier hydrocarbons adsorbed to the underburden, for example, may be reduced over time. Eventually, the formation may be considered low-producing or economically undesirable to produce hydrocarbons.

In some embodiments, injection of a hydrocarbon recovery composition after treating the hydrocarbon containing formation with a hydrocarbon removal fluid can enhance mobilisation of heavier hydrocarbons that may be absorbed to the underburden. The hydrocarbon recovery composition may interact with the hydrocarbons to reduce the IFT between the hydrocarbons and the underburden. Reduction of the IFT may be such that hydrocarbons are mobilised to and produced from the production well. Produced hydrocarbons from the production well may therefore also include at least a portion of the components of the hydrocarbon recovery composition and the hydrocarbon removal fluid injected into the well as a pre-treatment. Adding the hydrocarbon recovery composition to at least a portion of a low-producing hydrocarbon containing formation may extend the production life of the hydrocarbon containing formation.

Interaction of the hydrocarbon recovery composition with at least a portion of hydrocarbons in the formation may reduce at least a portion of an IFT between the hydrocarbons and the underburden. Reduction of at least a portion of the IFT may also mobilise at least a portion of hydrocarbons through the hydrocarbon containing formation. Mobilisation of at least a portion of hydrocarbons, however, may not be at an economically viable rate. In one embodiment, therefore, polymers and/or monomers may be injected into the hydrocarbon formation through the injection well (e.g. after treatment of the formation with a hydrocarbon recovery composition), to increase mobilisation of at least a portion of the hydrocarbons through the formation. Suitable polymers include, but are not limited to, CIBA® ALCOFLOOD®, manufactured by Ciba Specialty Additives (Tarrytown, N.Y.), Tramfloc® manufactured by Tramfloc Inc. (Temple, Ariz.), and HE® polymers manufactured by Chevron Phillips Chemical Co. (The Woodlands, Tex.). Interaction between the hydrocarbons, the hydrocarbon recovery composition and the polymer may increase mobilisation of at least a portion of the hydrocarbons remaining in the formation to the production well.

The branched internal olefin sulfonate component of the hydrocarbon recovery composition is thermally stable and may be used over a wide range of temperatures. Thus, the hydrocarbon recovery composition may be added to a hydrocarbon containing formation that has an average temperature of from 0 to 160° C. because of the high thermal stability of the branched internal olefin sulfonates.

Conveniently, the branched internal olefin composition of the invention may be combined with at least a portion of a hydrocarbon removal fluid (e.g. water, polymer solutions) to produce an injectable fluid for use as a hydrocarbon recovery composition, and the hydrocarbon recovery composition may be injected into a hydrocarbon containing formation through an injection well. Interaction of the hydrocarbon recovery composition with hydrocarbons in the formation may reduce at least a portion of the IFT between the hydrocarbons and the underburden. Reduction of at least a portion of the IFT may mobilise at least a portion of hydrocarbons in a selected section of the hydrocarbon containing formation to form a hydrocarbon pool. In this case, at least a portion of the hydrocarbons may be produced from the hydrocarbon pool in the selected section of the hydrocarbon containing formation. In other cases, mobilisation of at least a portion of hydrocarbons may not be at an economically viable rate, in which case polymers may be injected into the hydrocarbon formation to increase mobilisation of at least a portion of the hydrocarbons. Interaction between at least a portion of the hydrocarbons, the hydrocarbon recovery composition and the polymers—when used, may increase mobilisation of at least a portion of the hydrocarbons to production well.

In some embodiments, a hydrocarbon recovery composition may include an inorganic salt (e.g. sodium carbonate, $Na_2CO_3$; sodium chloride, NaCl; or calcium chloride, $CaCl_2$). The addition of the inorganic salt may help the hydrocarbon recovery composition disperse throughout a hydrocarbon/water mixture. The enhanced dispersion of the hydrocarbon recovery composition may decrease the interactions between the hydrocarbon and water interface. The decreased interaction may lower the IFT of the mixture and provide a fluid that is more mobile.

Transport, Storage and Surface Handling of EOR Surfactants

The physical properties of EOR surfactants not only play an important role in their manufacture, they are particularly important when it comes to transport, storage, blending, pumping and injection down-hole of an alkaline surfactant polymer (ASP) or surfactant polymer (SP) formulation. Given the potentially large volumes of surfactants that need to be manufactured and transported to the field, and the fact that water, unreacted organic matter and other leftover chemicals from the reaction process are part of the product that is shipped, it is highly desirable that the surfactant active matter be as high as possible. This will also reduce transportation costs and logistical issues.

There are different approaches that can be taken to accomplish this goal, from high active matter (HAM) concentrates of the surfactants (e.g. active matter above 50%), to liquid blends that combine the surfactants and the solvent to be used. Whichever form is chosen to transport the surfactants to the field, during transportation and storage the product should be a stable material that will not phase-separate, or produce any kind of precipitate that will require later remixing or heating before transfer from one vessel to another or before injection down-hole. The branched internal olefin mixtures of the invention are beneficial in this regard.

The material should ideally be pumpable under the required conditions, i.e. it should have a low viscosity, no yield stress, a low pour point and it should not be flammable. These desirable conditions can be difficult to achieve as the active matter of the surfactant increases, such as is the case of HAM surfactants, because viscosity of the surfactants typically increase with the concentration of active material. In these cases special pumping equipments may be required. The Applicant's testing has shown that at ambient temperature, the larger the internal olefin group of the sulfonate, the lower the % active at which the transition between a flowable liquid and a non-flowable gel occurs. As would be expected, generally the % active at which this transition occurs increases as the temperature increases. The temperature at which the transition between flowable liquid and non-flowable material (e.g. gel) happens can be thought of as a pour point.

The Applicant has also conducted rheological studies of IOS fractions to obtain further insight into the best handling conditions for such products (data not shown). The rheological behaviour of an IOS fraction at relatively high concentrations of active (e.g. 23%) was examined over a wide range of shear rates at three temperatures. It was observed that temperature thickening behaviour occurred at all shear rates; and the composition was very shear thinning. Viscosity was found to increase to very high levels as the shear rate dropped, however, it does not exhibit a yields stress. Since the composition is so shear thinning, in practical terms, it means that only a small rate of agitation may be required to drop the viscosity of a relatively high concentration active to manageable levels (e.g. under 1,000 cP at 10 sec$^{-1}$), for example, in order to help transfer the compositions from one container to another.

However, a simpler solution than the use of HAM surfactants may be to use premixed blends of surfactants at set ratios along with the solvent to be used in the flood. Possible solvents for use in EOR are butyl alcohols, such as di-glycol butyl ether (DGBE), with the IUPC name 2-(2-butoxyethox) ethanol). These solvents are miscible with water and have some capacity to dissolve surfactants with relatively large hydrophobes. Hence, an alkyl sulfonate may dissolve more readily in a butyl alcohol/water blend than in pure water or saline. The pour point of these blends is likely to be lower as well. Butyl alcohols are flammable, and blends of butyl alcohol with water are likely to be flammable as well. However, the flash point of the butyl alcohol/water blends is lower than those of the butyl alcohol itself.

The invention will now be further illustrated by way of the following non-limiting examples.

EXAMPLES

Unless otherwise indicated, commercially available reagents and standard techniques were used.

Example 1

1.1 Synthesis/Manufacture of Surfactants

Hydrocarbon recovery compositions including mixtures of internal olefin sulfonate molecules were prepared and interfacial tension measurements were compared for a variety of different compositions.

Internal olefin fractions C15-18, C19-23, C20-24 and C24-28 were manufactured in 1 to 2 ton scale quantities for EOR field trials using the pilot scale sulfonation facilities. These internal olefins were sulfonated and tested as described below.

The C15-18, C19-23, and C24-28 fractions of internal olefins were a mixture of molecules having odd and even numbers of carbon atoms. On the other hand, the C20-24 fraction of internal olefins (made from alpha olefins) was predominantly made up of olefin molecules having an even number of carbon atoms.

1.2 Characterisation of Surfactants

Table 1 shows the typical properties of the IOS surfactants studied. Active matter was obtained using the ASTM D6173 method; sulfate content using ASTM D6174; and free oil content using ASTMD D3673.

The number of carbon atoms in each molecule and the length range of the IOS fractions was measured by GC analysis of the internal olefin feedstock. As shown in Table 1, the average molecular weight of the C15-18 fraction was 232; the average molecular weight of the C19-23 fraction was 295; the average molecular weight of the C20-24 fraction was 287; and the average molecular weight of the C24-28 fraction was 378.

Branching content as a percentage of weight of the internal olefin molecules (% w; i.e. high/low) was determined by a GC-GC method. Meanwhile, the branching index of the alcohols (number of branches per molecule) was measured by a 13C NMR method. As indicated, the IOS 19-23 and IOS 24-28 fractions had a "high" level of branching (e.g. which can be considered to be at least 50%); whereas the IOS 15-18 and ISO 20-24 fractions had a "low" level of branching (e.g. less than 50%).

Internal olefin (IO) samples were analysed by gas chromatography (GC) prior to sulfonation to determine the carbon-chain length distribution of the molecules in each population. The GC analysis results for a C19-23 IO sample according to the invention demonstrates that in this mixture the fraction of C18 and lighter (i.e. molecules having 18 or less carbon atoms) is approximately 13.4 w %; and the fraction of C24 and heavier (i.e. molecules having 24 or more carbon atoms) is approximately 21 w %. It further showed that the full carbon number (CN) range is from C14 to C38 (i.e. 14 to 38 carbon atoms per molecule). In this sample of C19-23 internal olefins, at least approximately 65 wt % of the IO molecules are in the 19-23 range.

The branching index of the sample of C19-23 internal olefins was determined to be 0.9.

IOS samples were analysed by a liquid chromatography-mass spectrometry (LC-MS) method. The principle being to pre-separate ionic species by a first step of liquid chromatography, to eliminate sample matrix effects as well as providing additional structural information. Electrospray mass spectrometry is then applied for compositional analysis. Negative electrospray is preferred over positive electrospray ionisation, since it is more selective towards sulfonate anions and less prone to cluster ion formation.

1.3 Characterisation of Crude Oils

The compositions of the crude oils used for testing the internal olefin sulfonates of the invention were analysed by several methods. The total acid number (TAN) was measured by the ASTM D664 method, and is calculated on the basis of the amount of potassium hydroxide in milligrams that is needed to neutralise the acids in one gram of oil.

The percentage of different solubility classes, known as "SARA" (saturates, aromatic, resins, asphaltenes) was also measured. First, the asphaltenes were separated by precipitation with an alkane such as n-hexane. The remaining soluble components (SAR) were then separated by high performance liquid chromatography or column chromatography, with the resins dissolving in, for example, trichloromethane, and the saturates and aromatics dissolving in, for example, n-hexane. Additional information on polar components in the crude oils was obtained by measuring the specific chemical family naphthenic acids, defined as all carboxylic acid containing crude oil components. These components are the natural surfactants of crude oils, and are relevant as they may affect ASP formulation performance. A summary of the crude oil compositions is displayed in Table 2.

1.4 Surfactant Evaluation Methods

Surfactant compositions were evaluated and compared by a number of different methods.
1.4.1 Microemulsion Phase Behaviour Microemulsion phase behaviour was first described and defined by Winsor in the following categories: "type I" (i.e. oil in water); "type II" (i.e. water in oil); and "type III" (i.e. bicontinuous oil/water phase), which is also known as a middle phase microemulsion (Winsor, "*Solvent properties of amphiphilic compounds*" Butterworths, London, 1954).

For anionic surfactants, increasing the salinity causes a transition from Winsor type I to type III and then to type II. "Optimal salinity" can be defined where equal amounts of oil and water are solubilised in the middle phase (i.e. type III)

microemulsion. The "oil solubilisation parameter" is the ratio of oil volume (Vo) to neat surfactant volume (Vs); and the "water solubilisation ratio" is the ratio of water volume (Vw) to neat surfactant volume (Vs). The intersection of Vo/Vs and Vw/Vs as salinity is varied thus defines the optimal salinity and the solubilisation parameter at the optimal salinity. It has been established that IFT is inversely proportional to the square of the solubilisation parameter (Huh, "*Interfacial tensions and solubilizing ability of a microemulsion phase that coexists with oil and brine*", J. Colloid and Interface Sci., September 1979, pp 408426). Therefore, when the solubilisation parameter is 10 or higher, the IFT at the optimal salinity is <$10^{-2}$ dyne/cm. This is generally considered to be the IFT level that is required to sufficiently mobilise residual oil in a reservoir for effective surfactant EOR. Accordingly, for the purposes of the invention, it is desirable that the solubilisation parameter generated by a surfactant system of the invention is 10 or greater—with the higher the value the more "active" the surfactant.

As well as indicating the point at which low or ultra low IFTs are achieved, the microemulsion phase test provides further qualitative information that is relevant when it comes to performing a surfactant flood in situ. Such further information includes the viscosity of phases, wetting behaviour, the presence of undesirable macroemulsions or gels, and the time for the phases to equilibrate (a fast equilibration, e.g. within 12 hours, would indicate a more promising system). Microemulsion phase tests thus have a number of advantages for screening surfactants over IFT measurements alone (e.g. by the spinning drop method).

The detailed microemulsion phase test method used in the present invention has been described previously (Barnes et al., "*Development of Surfactants for Chemical Flooding at Difficult Reservoir Conditions*", SPE-113313-PP; see e.g. Section 2.1, "Glass pressure test tube").

Most tests used a standard set of conditions: surfactant at 2% active in the aqueous phase; sodium chloride for the salinity scan; n-octane as a model oil; and temperature at 90° C. In the Applicant's experience, it can be preferable to screen single surfactants with n-octane (as a model oil) without any co-solvent to assess a surfactant's inherent ability to form middle phase microemulsions that are free of gels and liquid crystal phases. In this regard, n-octane is used as a model oil to approximate to a low equivalent alkane carbon number (EACN) crude oil. The internal olefin sulfonate fractions were tested without any co-solvent since gel phases were not detected. Microemulsion phase tests with crude oils were carried out in an alkaline surfactant polymer (ASP) context: with co-solvent, typically at 0.3% active surfactant and with a mixture of NaCl and $Na_2CO_3$, the latter generating hydrophobic natural soaps from the crude oil that contribute to the overall optimal salinity and activity measured. In these tests the activity of the surfactants with a particular crude oil were judged by (i) swaying the tubes to visualise the quality of any microemulsion formed; and (ii) measuring the volume of the middle phase microemulsion at equilibrium.

1.4.2 Rheology

Different instruments were used for rheological measurements. An Anton-Paar MCR 301 rheometer was used for liquid samples, such as C20-24 IOS (23% active) fitted with a double-gap Couette geometry. This geometry allows greater sensitivity at low shear rates (below 0.1 $sec^{-1}$), without limiting higher shear rates. For paste-type samples, such as C24-28 IOS (63% active) the same Anton-Paar rheometer was used, but fitted with a cone and plate geometry, as these samples are semi-solid and Couette geometry cannot be used. Also, a Brookfield DV-III Ultra Viscometer, fitted with a cone and plate geometry and a special chamber to handle flammable samples, was also used to determine the effect of solvent dilution on viscosity of HAM surfactant systems.

Example 2

2.1 Structure—Performance Correlations

In this Example the structure—phase behaviour relationships of the IOS fractions are described, particularly with respect to surfactants produced on a large scale.

2.2 Internal Olefin Sulfonates with n-Octane

Figure 2:
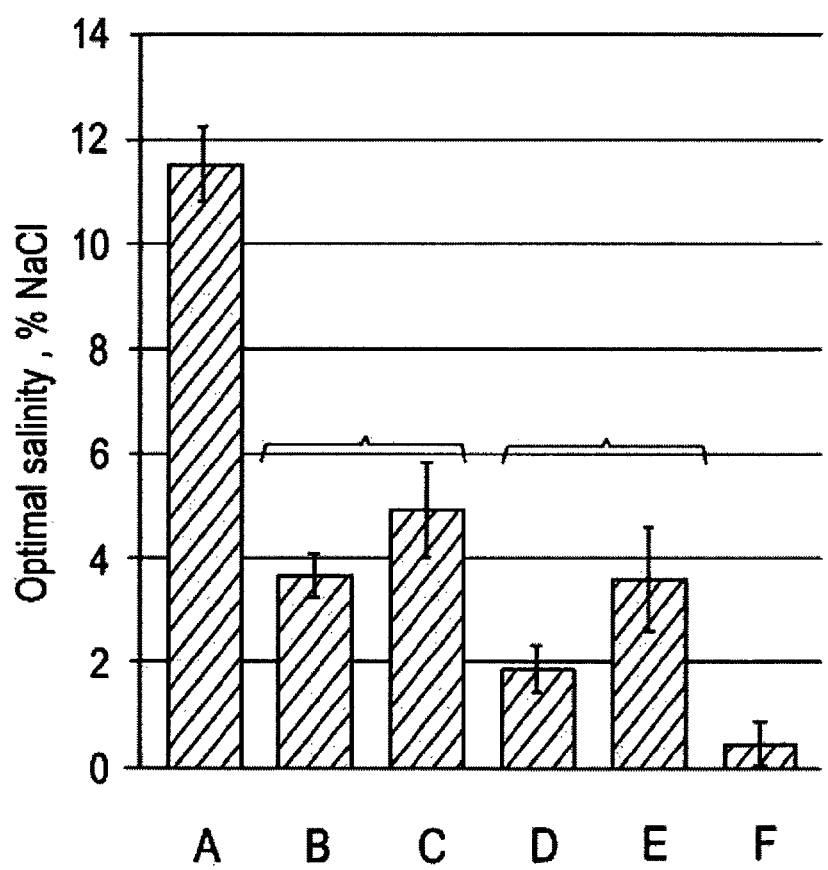
FIG. 2 shows the optimal salinities (measured with n-octane model oil at 90° C.) for pilot scale internal olefin sulfonate samples: (A) IOS fraction C15-18 at low sulfonation level; (B) IOS fraction C19-23 at low sulfonation level; (C) IOS fraction C19-23 at high sulfonation level; (D) IOS fraction C20-24 at low sulfonation level; (E) IOS fraction C20-24 at high sulfonation level; (F) IOS fraction C24-28 at low sulfonation level.

Measurements of optimal salinity for pilot scale produced IOSs made with internal olefin carbon chain fractions or cuts C15-18, C19-23, C20-24 and C24-28 are shown in FIG. 2, which includes low and high $SO_3$/olefin ratio products for the C19-23 and C20-24 internal olefin cuts. The IOSs were generally produced in the range of 28-36% active, though a few additional batches were made at a high active content. FIG. 2 demonstrates that as the internal olefin chain length is increased (e.g. from C15-18 to C24-28), the optimal salinity decreases (from approx. 11.5% to approx. 0.5%). This is consistent with the increased hydrophobicity of the surfactant and was also seen for laboratory scale samples produced and tested (data not shown). The error bands around the mean value (±2 standard deviations) indicate the variability between different batches made with slightly different process conditions. The fact that the error bands are relatively small show that any manufacturing process changes there may have been affected optimal salinity only slightly.

FIG. 2 also demonstrates that an increased $SO_3$/olefin ratio raises the optimal salinity of the mid-range IOSs. Again this result is consistent with the Applicant's testing of smaller laboratory-produced samples (data not shown). For the IOS 20-24 fraction, optimal salinity was shown to shift from approximately 2% to approximately 3.5%; whereas for the IOS 19-23 fraction, the optimal salinity shifted from approximately 3.5% to approximately 5%. The higher optimal salinities measured for the IOS 19-23 surfactant fraction, in comparison to the IOS 20-24 fraction, may be associated with the increased branching of the internal olefin chain which is a feature of this mixture of IOS molecules (see Table 1). Thus, it appears that the increase in branching might lead to the observed increase in both water solubility and optimal salinity. In terms of the IOS chemical composition, an IOS produced with a higher $SO_3$/olefin ratio is likely to have higher levels of more hydrophilic di-sulfonates, which may contribute to a higher optimal salinity. Indeed, this is seen for both the IOS 20-24 and IOS 19-23 fractions (see Table 1).

Figure 3:
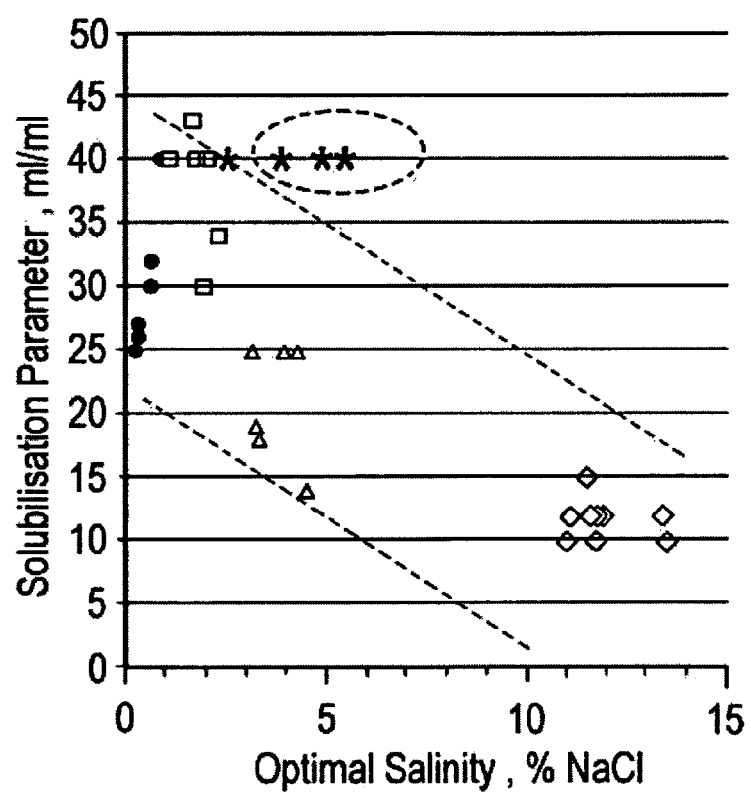
FIG. 3 is a graph of solubilisation parameter against optimal salinities (measured with n-octane model oil at 90° C.) for pilot scale internal olefin sulfonate samples: IOS fraction C15-18 at low sulfonation level (filled diamond); IOS fraction C19-23 at low sulfonation level (cross); IOS fraction C19-23 at high sulfonation level (asterisk); IOS fraction C20-24 at low sulfonation level (filled square); IOS fraction C20-24 at high sulfonation level (filled triangle); IOS fraction C24-28 at low sulfonation level (filled circle). The expected negative correlation between solubilisation parameter and optimal salinity is represented generally by the diagonal parallel dotted lines; and the data from the IOS C19-23 fractions which does not follow the expected trend is highlighted within a dotted ellipse.

The graph of FIG. 3 shows the solubilisation parameter against optimal salinity for the pilot scale produced IOSs. Since solubilisation parameter numbers of at least 10 correspond to ultra low IFTs the levels measured, which are in the range of 10 to 40, show that the surfactants are promising for use in EOR. The data for most of the IOS fractions (i.e. IOS 15-18; IOS 20-24 and IOS 24-28) show the expected trade off/negative correlation expected for surfactants of decreasing solubilisation parameter with increasing optimal salinity. This trend is illustrated graphically by "typical band" shown in dotted lines on the graph. Interestingly, however, the IOS 19-23 fraction of surfactants does not follow this trend. In contrast, the solubilisation parameter of the IOS 19-23 fraction remains relatively constant despite the change in optimal salinity for a particular formulation: for example, in the range of approximately 3 wt % to approximately 6 wt % salinity, the solubilisation parameter remained extremely high and approximately constant at 40 ml/ml (see dotted circle on graph). These results were further validated by tests with a crude oil sample where high activity at a moderate optimal salinity was seen (see below).

It should be noted that no gel phases were seen for any of the IOS tests. This and the fact that the tests were carried out without any co-solvent confirms that the IOS products are sufficiently varied in chemical structure to prevent surfactant ordering at the interface that can lead to high viscosity liquid crystal phases. The IOS family also covers a range of salinities making it a versatile group of surfactants for use in surfactant floods.

Finally, to evaluate product consistency, IOS fractions were manufactured on a number of different occasions (e.g. 3 times) using identical and carefully controlled process conditions, with 200-300 kg of product being made on each occasion at a sulfonation pilot plant. Microemulsion phase behaviour tests, composition (by LC-MS), and standard property tests (% active, free oil) showed that different production batches were highly similar, demonstrating that good consistency/reproducibility can be achieved. This work thus demonstrates that through stringent control of process conditions IOSs can be manufactured with consistent quality.

2.3 Tests with Crude Oil

Several of the pilot scale produced IOSs have been microemulsion phase tested with a crude oil ("crude F") under ASP conditions. The results are summarised in Table 2 (shaded rows), which also displays the results using n-octane and n-dodecane as model oils for comparison.

The IOS fractions were tested at different temperatures: 90° C. for n-octane and n-dodecane tests, and 54° C. for the crude oil tests. The optimal salinity of an IOS fraction may increase slightly as temperature is decreased (data not shown). Since crude F has only low total acid number (TAN), in tests it will generate only low levels of hydrophobic natural soaps that will slightly contribute to the overall optimal salinity.

Table 2 shows that optimal salinity of each surfactant sample for n-octane was lower than for n-dodecane, which EACN effect has been reported elsewhere (Puerto & Reed, "*A three parameter representation of surfactant/oil/brine interaction*", SPEJ 10678). In addition, optimal salinities measured for crude F were higher than those measured for n-octane showing it to have a higher EACN. With the exception of the long chain IOS 24-28 fraction, moderate to high activity was seen for all the surfactants tested with crude F. The lack of match of the IOS 24-28 fraction to crude F may indicate a lack of compatibility of the long carbon tails of the surfactant with components of this particular crude oil.

Interestingly, however, it is notable that the IOS 19-23 fraction gave the unusual characteristic of high activity associated with a relatively high optimal salinity, making this surfactant composition a highly effective component for formulations designed for moderate to high reservoir salinities, e.g. around the levels found in sea water and higher.

TABLE 2

Summary of phase behaviour of IOS fractions

| Surfactant* | Oil | Optimal Salinity (% m NaCl equivalent) | Activity (Solubilisation Parameter) | Comments** |
|---|---|---|---|---|
| IOS 15-18 | n-octane | 11.2 | Moderate (12) | 2% active surfactant; at 90° C.; no cosolvent |
| IOS 15-18 | n-dodecane | 15 | Moderate (12) | 2% active surfactant; at 90° C.; no cosolvent |
| IOS 20-24 Low SO3 | n-octane | 2.3 | High (34) | 2% active surfactant; at 90° C.; no cosolvent |
| IOS 20-24 Low SO3 | crude F | 4.1 | High | 0.3% active surfactant; at 54° C.; with 1% DGBE |
| IOS 19-23 Low SO3 | n-octane | 3.5 | High (40) | 2% active surfactant; at 90° C.; no cosolvent |
| IOS 19-23 Low SO3 | n-dodecane | 6.5 | High (25) | 2% active surfactant; at 90° C.; no cosolvent |
| IOS 19-23 Low SO3 | crude F | 6.6 | Moderate | 0.3% active surfactant; at 54° C.; with 1% DGBE |
| IOS 24-28 | n-octane | 0.6 | High (30) | 2% active surfactant; at 90° C.; no cosolvent |
| IOS 24-28 | n-dodecane | 0.9 | High (25) | 2% active surfactant; at 90° C.; no cosolvent |
| IOS 24-28 | crude F | 1.1*** | Low | 0.3% active surfactant; at 54° C.; with 1% DGBE |

*All samples are pilot scale produced except for the C12, 13 (BI1.2) sample which was made on a laboratory scale.
**For tests with crude F: a) salinity includes $Na_2CO_3$ which generates some natural soaps that contribute to overall Optimal Salinity, and b) activity (high, moderate or low) is judged by microemulsion behaviour when swaying the tubes (see Experimental Section)
***No Middle phase Winsor III behaviour seen though a transition from Type I to II at salinity of 1.1% NaCl equivalent The crude oil samples came from several regions of the world. Properties of these crude oils are summarised in Table 3. It shows them to have relatively low Total Acid Numbers (TANs) and to be relatively light by API standards. Nevertheless they contain significant fractions of heavier components such as resins and asphaltenes (see shaded rows in Table 3) with crudes C, D and E having the higher levels and crudes A and B having the lower levels. It can be hypothesised, through the Winsor solubilisation concept, that these heavier components will help solvate longer surfactant tails such as C24-28 though an increased tail-oil interaction energy between the surfactant and the crude oil (Salger et al., 2005, "*Enhancing solubilisation and microemulsions—state of the art and current trends*", J. Surfactants and Detergents, Vol. 8, No 1).

In addition, asphaltenes and napthenic acids are surface active components and will likely move to the oil/brine interface and interact with the surfactants making their influence stronger than it would be in the bulk oil. Indeed one can hypothesise that the crude oil composition at the interface "seen" by the surfactant may be different from that of the bulk hydrocarbon composition.

TABLE 3

Summary of crude oil compositions

| Crude oil | API | TAN | Oil composition (% w) | | | | Naphthenic acids (ppm) |
|---|---|---|---|---|---|---|---|
| | | | Saturates | Aromatics | Resins | Asphaltenes | |
| A | 38.1 | 0.14 | 59.2 | 33 | 7.6 | 0.2 | 3230 |
| B | 33.1 | 0.19 | 44.4 | 44.8 | 10.5 | 0.2 | 3010 |
| C | 31.3 | 0.04 | 28.6 | 53.9 | 12.2 | 5.3 | 1500 |
| D | 26.5 | 0.07 | 27.5 | 52.3 | 13.6 | 6.6 | n.m |
| E | 37.3 | 0.03 | 34.1 | 49.3 | 14.9 | 1.7 | 1856 |
| F | 33.4 | 0.08 | n.m | n.m | n.m | n.m | n.m | n.m = not measured

CONCLUSIONS AND DISCUSSION

First, the data presented herein demonstrates that the hydrocarbon recovery compositions of the invention exhibit the primary performance requirement of an EOR surfactant, namely that it is capable of generating an ultra low IFT as measured by phase behaviour tests at conditions simulating a natural hydrocarbon formation or reservoir.

As described above, the optimal salinities and solubilisation parameters ("activities") for ranges (or cuts) of internal olefins sulfonate molecules have been measured using n-octane as a model oil. From the results of optimal salinity and the supplementary data/information described, a "map" can be produced to select which surfactant composition is most appropriate for particular reservoir salinities and temperature combinations. An IOS-based surfactant composition is relatively temperature stable and can be used at temperatures of above 60° C., such as up to around 150° C., making them suitable for covering most of the range of reservoir temperatures required for surfactant EOR. In contrast, the C—O—S bond in known alcohol-alkoxy-sulfate based surfactants will hydrolyse at temperatures exceeding about 60° C.

In particular, the results presented herein demonstrate that a hydrocarbon recovery composition comprising a mixture of internal olefin sulfonate molecules having an average number of carbon atoms of 19 to 23 has very high activity across a broad range of salinities (e.g. over the range of approximately 2.5 wt % to 8 wt %). Thus, the composition of the invention is suitable for use in many reservoir conditions around the world, and particularly those having salinity levels of around seawater and slightly above.

The surfactant compositions of the invention, i.e. the highly branched IOS 19-23 fraction, comprise a wide range of molecules of different structures, which makes it suitable for use alone, without requiring co-surfactants. However, surfactant combinations including the aforementioned IOS 19-23 fraction and another IOS fraction or an alcohol-alkoxy-sulphate or an alcohol-alkoxy-glycidyl sulphonate may also be used in accordance with the invention. Such combinations may provide utility under a wider range of conditions, such as salinity range, temperature, water hardness or crude oil compositions.

The work investigating handling properties of the IOS family has shown that higher active liquid products that are pumpable are achievable, although lack of fluidity becomes more of a factor as the surfactant molecular weight increases. The use of alcohol and alcohol-ether as additives may help to reduce the viscosity and pour point of the IOS composition.

The IOS 19-23 fraction is particularly useful since it is commercially available and can be manufactured on a large scale. It has also been shown that the IOS fractions can be manufactured with consistent quality.

In the manufacture of IOSs for use in accordance with the invention, it has been shown that the $SO_3$/olefin ratio in the sulfonation step has an influence on EOR product performance. A higher $SO_3$/olefin ratio gives a higher optimal salinity range, whereas a lower $SO_3$/olefin ratio gives a lower optimal salinity range for the IOS 19-23 fraction.

What is claimed is:

1. A method of treating a hydrocarbon containing formation, comprising:
   providing a hydrocarbon recovery composition comprising a mixture of branched internal olefin sulfonate molecules, the mixture having an average number of carbon atoms of between 19 and 23, and an average number of branches of at least 0.6 per molecule, wherein at least 50% of the branched internal olefin sulfonate molecules have between 19 and 23 carbon atoms and the branched internal olefin sulfonate molecules are made by sulfonation of internal olefin molecules having odd and even numbers of carbon atoms; and
   contacting hydrocarbons in the hydrocarbon containing formation with the hydrocarbon recovery composition.

2. The method of claim 1, wherein the mixture of branched internal olefin sulfonate molecules has an average number of carbon atoms of between 20 and 23.

3. The method of claim 1, wherein the mixture of branched internal olefin sulfonate molecules has an average number of carbon atoms of between 21 and 22.

4. The method of claim 1, wherein at least 65% of the branched internal olefin sulfonate molecules have between 19 and 23 carbon atoms.

5. The method of claim 1, wherein the average molecular weight of the mixture of branched internal olefin sulfonate molecules is from 265 to 325.

6. The method of claim 1, wherein the average molecular weight of the mixture of branched internal olefin sulfonate molecules is from 280 to 310.

7. The method of claim 1, wherein the average molecular weight of the mixture of branched internal olefin sulfonate molecules is from 290 to 300.

8. The method of claim 1, wherein the average number of branches per olefin molecule is from 0.6 to 3.0.

9. The method of claim 1, wherein the average number of branches per olefin molecule is from 0.6 to 2.0.

10. The method of claim 1, wherein the average number of branches per olefin molecule is from 0.6 to 1.2.

11. The method of claim 1, wherein at least 60% of the olefin molecules contain at least one branch.

12. The method of claim 1, wherein the average number of sulfonate groups per olefin molecule is from 0.7 to 2.5.

13. The method of claim 1, wherein the average number of sulfonate groups per olefin molecule is less than 1.0.

14. The method of claim 13, wherein the hydrocarbon recovery composition has a salinity of from 2.5 wt % to 4.5 wt %.

15. The method of claim 1, wherein the average number of sulfonate groups per olefin molecule is at least 1.3.

16. The method of claim 15, wherein the hydrocarbon recovery composition has a salinity of from 4.5 wt % to 8 wt %.

17. The method of claim 1, wherein the mixture of branched internal olefin molecules comprises: at least 50% hydroxyalkane sulfonate molecules; up to 40% alkene sulfonate molecules; and up to 10% di-sulfonate molecules.

18. The method of claim 1, wherein the mixture of branched internal olefin molecules comprises: from 50% to 90% hydroxyalkane sulfonate molecules; from 10% to 40% alkene sulfonate molecules; and from 0% to 10% di-sulfonate molecules.

19. The method of claim 1, wherein the mixture of branched internal olefin molecules comprises: from 56% to 64% hydroxyalkane sulfonate molecules; from 32% to 37% alkene sulfonate molecules; and from 4% to 7% di-sulfonate molecules, provided that the total adds up to 100%.

20. The method of claim 1, wherein the hydrocarbon recovery composition further comprises water and/or brine and has a salinity of from 2.5 wt % to 10 wt %.

21. The method of claim 1, wherein the hydrocarbon recovery composition further comprises water and/or brine and has a salinity of from 3.0 wt % to 7 wt %.

22. The method of claim 1, wherein the hydrocarbon recovery composition further comprises water and/or brine and has a salinity of from 3.5 wt % to 6.6 wt %.

23. The method of claim 1, wherein the hydrocarbon recovery composition further comprises water and/or brine and wherein the mixture of branched internal olefin sulfonate molecules comprises from 0.01 wt % to 3.0 wt % of the composition.

24. The method of claim 1, wherein the hydrocarbon recovery composition further comprises water and/or brine and wherein the mixture of branched internal olefin sulfonate molecules comprises from 0.05 wt % to 2.0 wt % of the composition.

25. The method of claim 1, wherein the hydrocarbon recovery composition further comprises water and/or brine and wherein the mixture of branched internal olefin sulfonate molecules comprises from 0.1 wt % to 1.0 wt % of the composition.

26. The method of claim 1, wherein the hydrocarbon recovery composition further comprises a solubilising agent.

27. The method of claim 1, wherein the hydrocarbon recovery composition further comprises a co-solvent.

28. The method of claim 1, wherein the hydrocarbon recovery composition further comprises an alkali.

29. The method of claim 1, wherein the hydrocarbon recovery composition further comprises a polymer.

* * * * *